US012323671B2

(12) United States Patent
Fang et al.

(10) Patent No.: US 12,323,671 B2
(45) Date of Patent: Jun. 3, 2025

(54) SCREEN SHARING METHOD AND SYSTEM AND ELECTRONIC DEVICE

(71) Applicant: HUAWEI TECHNOLOGIES CO., LTD., Guangdong (CN)

(72) Inventors: Weiqing Fang, Munich (DE); Junfeng Yang, Xi'an (CN); Lei Wang, Nanjing (CN); Feng Ge, Xi'an (CN); Xunfei Suo, Shenzhen (CN); Xiangning Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/043,561

(22) PCT Filed: Aug. 6, 2021

(86) PCT No.: PCT/CN2021/111113
§ 371 (c)(1),
(2) Date: Feb. 28, 2023

(87) PCT Pub. No.: WO2022/042261
PCT Pub. Date: Mar. 3, 2022

(65) Prior Publication Data
US 2023/0269437 A1 Aug. 24, 2023

(30) Foreign Application Priority Data
Aug. 29, 2020 (CN) .......................... 202010890853.2

(51) Int. Cl.
H04N 21/4788 (2011.01)
H04N 21/433 (2011.01)
(52) U.S. Cl.
CPC ....... H04N 21/4788 (2013.01); H04N 21/433 (2013.01)

(58) Field of Classification Search
CPC .... H04N 21/4788; H04N 21/433; H04N 7/15; H04N 21/4122; H04N 21/41407;
(Continued)

(56) References Cited

U.S. PATENT DOCUMENTS 11,082,467 B1 * 8/2021 Hartnett ................ H04L 65/403
2008/0125104 A1 5/2008 You et al.
(Continued)

FOREIGN PATENT DOCUMENTS

CN 102541428 A 7/2012
CN 102685079 A 9/2012
(Continued)

OTHER PUBLICATIONS

"Series H: Audiovisual and Multimedia Systems, Infrastructure of Audiovisual Services Coding of Moving Video, Advance Video Coding for Generic Audiovisual Services," ITU-T, Telecommunication Standardization Sector of ITU H.264, Mar. 2010, 676 pages.
(Continued)

Primary Examiner — Michael R Telan

(57) ABSTRACT

A screen sharing method and system and an electronic device are provided. The screen sharing system may include a first electronic device, a second electronic device, a third electronic device, and a fourth electronic device. The third electronic device may be an electronic device near the first electronic device. The fourth electronic device may be an electronic device near the second electronic device. In the method, the first electronic device may establish a video communication connection to the second electronic device. The third electronic device may share a screen of the third electronic device with the second electronic device by using the first electronic device. The second electronic device may display the screen shared by the third electronic device, and
(Continued)

may further switch the screen shared by the third electronic device to the fourth electronic device for display.

21 Claims, 20 Drawing Sheets

(58) Field of Classification Search
CPC ....... H04N 21/43637; H04N 21/44227; H04N 7/147; H04N 7/14; H04N 21/4334; G09G 2340/04
See application file for complete search history.

(56) References Cited

U.S. PATENT DOCUMENTS

| | | | |
|---|---|---|---|
| 2009/0319947 A1 | 12/2009 | Wang et al. | |
| 2011/0158605 A1* | 6/2011 | Bliss | H04N 21/4524 386/E5.003 |
| 2014/0118476 A1 | 5/2014 | Nagase et al. | |
| 2016/0165121 A1 | 6/2016 | Chien et al. | |
| 2018/0083961 A1* | 3/2018 | Lewis | G06F 21/44 |
| 2019/0272142 A1 | 9/2019 | Choi et al. | |

FOREIGN PATENT DOCUMENTS

| | | | |
|---|---|---|---|
| CN | 102883135 | A | 1/2013 |
| CN | 103051950 | A | 4/2013 |
| CN | 103312804 | A | 9/2013 |
| CN | 103856604 | A | 6/2014 |
| CN | 104349108 | A | 2/2015 |
| CN | 106101605 | A | 11/2016 |
| CN | 108124115 | A | 6/2018 |
| CN | 108235111 | A | 6/2018 |
| CN | 108632560 | A | 10/2018 |
| CN | 109862301 | A | 6/2019 |
| CN | 109918032 | A | 6/2019 |
| CN | 110381195 | A | 10/2019 |
| CN | 110769394 | A | 2/2020 |
| CN | 111107223 | A | 5/2020 |
| CN | 111913628 | A | 11/2020 |
| CN | 112702557 | A | 4/2021 |
| EP | 2756668 | B1 | 1/2017 |
| WO | 2014201876 | A1 | 12/2014 |

OTHER PUBLICATIONS

ITU-T H.265(Apr. 2013), Series H: Audiovisual and Multimedia SystemsInfrastructure of audiovisual services—Coding of moving video, High efficiency video coding, 317 pages.

* cited by examiner

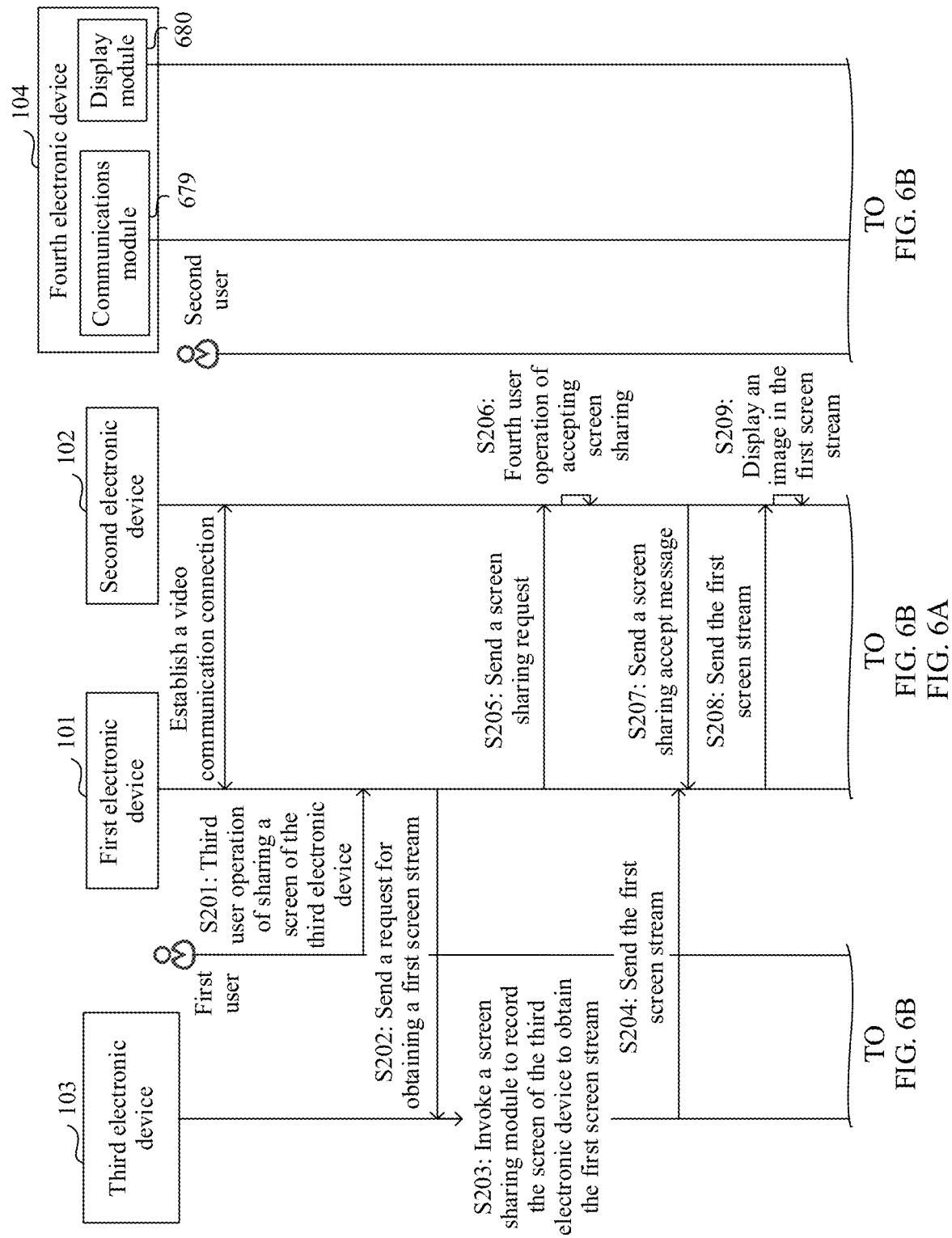

SCREEN SHARING METHOD AND SYSTEM AND ELECTRONIC DEVICE

CROSS-REFERENCE TO RELATED APPLICATIONS

This application is a national stage of International Application No. PCT/CN2021/111113, filed on Aug. 6, 2021, which claims priority to Chinese Patent Application No. 202010890853.2, filed on Aug. 29, 2020. Both of the aforementioned applications are hereby incorporated by reference in their entireties.

TECHNICAL FIELD

This application relates to the field of terminal technologies, and in particular, to a screen sharing method and system and an electronic device.

BACKGROUND

With development of communications technologies, audio/video communication is applied more widely. For example, through audio/video communication, people can implement remote conferences, video teaching, and face-to-face communication with relatives and friends. In some audio/video communication scenarios, people need to perform screen sharing to share materials and perform related demonstration.

Currently, in a scenario in which screen sharing is performed during video communication between two electronic devices, a shared screen is usually limited to two electronic devices that establish a video communication connection. Consequently, screen sharing between electronic devices is not flexible enough.

SUMMARY

This application provides a screen sharing method and system and an electronic device, so as to improve flexibility of screen sharing between electronic devices, so that an electronic device that is not during a video communication connection can also perform screen sharing by using an electronic device that establishes the video communication connection.

According to a first aspect, an embodiment of this application provides a screen sharing method. The method may be applied to a screen sharing system. The screen sharing system may include a first electronic device, a second electronic device, a third electronic device, and a fourth electronic device. The method includes: The first electronic device may establish a video communication connection to the second electronic device. The first electronic device may display a first interface, where a first video stream is played on the first interface, and the first video stream may be collected by the second electronic device by using a camera during the video communication connection. The second electronic device may display a second interface, where a second video stream is played on the second interface, and the second video stream may be collected by the first electronic device by using a camera during the video communication connection. The third electronic device may send a third video stream to the first electronic device, where the third video stream may include content on a screen of the third electronic device. The first electronic device may send the third video stream to the second electronic device after receiving the third video stream. The second electronic device may send a fourth video stream to the fourth electronic device after receiving the third video stream, where the fourth video stream includes content on the screen of the third electronic device. The fourth electronic device may play the fourth video stream.

In this application, the first electronic device may establish the video communication connection to the second electronic device. A video communication connection manner may be a video communication connection manner in the conventional technology or in the future. The third electronic device may be an electronic device near the first electronic device. The fourth electronic device may be an electronic device near the second electronic device. Communication between the first electronic device and the third electronic device may be short-range communication. Communication between the second electronic device and the fourth electronic device may also be short-range communication.

The first electronic device, the second electronic device, the third electronic device, and the fourth electronic device each may be an electronic device having a video communication function, for example, a mobile phone, a tablet, or a notebook computer. In addition, the third electronic device and the fourth electronic device each may alternatively be an electronic device having no video communication function. Optionally, the fourth electronic device 104 may alternatively be an electronic device having only a display function, for example, a projector or an electronic whiteboard.

With reference to the first aspect, during the video communication connection between the first electronic device and the second electronic device, the first electronic device may simultaneously play the first video stream and the second video stream in different display areas of the first interface. The second electronic device may simultaneously play the first video stream and the second video stream in different display areas of the second interface.

With reference to the first aspect, during the video communication connection between the first electronic device and the second electronic device, the first electronic device may receive a first user operation. The first user operation may be used to share the screen of the third electronic device with the second electronic device.

For example, when receiving the first user operation, the first electronic device may establish a connection to the third electronic device, and send a screen recording instruction to the third electronic device. When receiving the screen recording instruction, the third electronic device may perform screen recording and obtain the third video stream. The third electronic device may send the third video stream to the first electronic device. Further, the first electronic device may send the third video stream to the second electronic device.

In some embodiments, when receiving the third video stream, the second electronic device may play the second video stream in a display area A of the second interface, and play the third video stream in a display area B of the second interface. The second electronic device may cancel playing of the first video stream. Alternatively, the second interface further includes a display area C. The second electronic device may play the first video stream in the display area C.

With reference to the first aspect, the fourth video stream may be the third video stream. In other words, the second electronic device may directly forward the received third video stream to the fourth electronic device.

Alternatively, the fourth video stream may include the third video stream and the second video stream. In other words, the second electronic device may send the third video stream and the second video stream to the fourth electronic device. The fourth electronic device may play the third video stream and the second video stream.

In a possible implementation, the fourth video stream may be a third video stream obtained after adjustment such as resolution compression and/or format conversion. Alternatively, the fourth video stream may include a third video stream obtained after adjustment such as resolution compression and/or format conversion and a second video stream obtained after adjustment such as resolution compression and/or format conversion.

Before the second electronic device sends the fourth video stream to the fourth electronic device, the second electronic device may receive a second user operation of sharing, with the fourth electronic device, the screen shared by the third electronic device. When receiving the second user operation, the second electronic device may establish a connection to the fourth electronic device, and send the fourth video stream to the fourth electronic device.

In some embodiments, an example in which the fourth video stream is the third video stream or includes the third video stream is used. When the fourth electronic device plays the third video stream, the second electronic device may cancel playing of the third video stream on the second interface. In other words, after the second electronic device sends the third video stream to the fourth electronic device, the second electronic device may not display the screen shared by the third electronic device. The second electronic device may play the first video stream and the second video stream on the second interface.

Further, after the fourth electronic device cancels playing of the third video stream, the second electronic device may play the third video stream on the second interface. Specifically, in response to a user operation of canceling playing of the third video stream on the fourth electronic device, the fourth electronic device may send a message used to indicate that playing of the third video stream is canceled to the second electronic device. Then, the second electronic device may stop sending the fourth video stream to the fourth electronic device, and play the third video stream and the second video stream on the second interface.

In some other embodiments, an example in which the fourth video stream is the third video stream or includes the third video stream is still used. When the fourth electronic device plays the third video stream, the second electronic device may still cancel playing of the third video stream on the second interface. In other words, after the second electronic device sends the third video stream to the fourth electronic device, the second electronic device may play the second video stream and the third video stream on the second interface.

With reference to the first aspect, the fourth video stream may be obtained by the second electronic device by performing screen recording when the second electronic device plays the third video stream. Specifically, the third video stream is played on the second user interface of the second electronic device. In response to a second user operation of sharing, with the fourth electronic device, the screen shared by the third electronic device, the second electronic device may establish a connection to the fourth electronic device. Then, the second electronic device may send the fourth video stream obtained through screen recording to the fourth electronic device. In this way, content displayed on a screen of the fourth electronic device may include content on the screen of the third electronic device.

In this way, a first user of the first electronic device and a second user of the second electronic device may perform video communication by using the first electronic device and the second electronic device respectively. During the video communication, the first user may share the screen of the third electronic device (such as a mobile phone, a tablet, a television, or a notebook computer) near the first user with the second electronic device. The second user may view, by using the second electronic device, the screen shared by the first user. The second user may further switch the screen shared by the first user to the fourth electronic device (such as a mobile phone, a tablet, a television, or a notebook computer) near the second user for display. In this way, screen sharing between electronic devices is more flexible, shareable content is not limited to electronic devices that establish a video communication connection, and an electronic device having no video communication capability can also perform screen sharing by using an electronic device that establishes a video communication connection.

With reference to the first aspect, in a possible implementation, the third video stream may include a first mark. The first mark may be generated by the third electronic device based on a touch trace of a user on the screen. In other words, in a process in which the third electronic device shares the screen, the third electronic device may enable a graffiti mode. When the graffiti mode is enabled, the third electronic device may generate the first mark based on the touch trace of the user on the screen. The first mark may be included in the third video stream. When the second electronic device receives the third video stream and plays the third video stream on the second interface, the second interface may display the first mark made by the user on the screen of the third electronic device. The first mark may be, for example, a text, a horizontal line, or a circle.

With reference to the first aspect, in a process in which the third electronic device shares the screen, the first electronic device may display the screen shared by the third electronic device. When detecting that the first electronic device is far away from the third electronic device, the first electronic device may play the third video stream on the first interface. A method for detecting whether the first electronic device is far away from the third electronic device may include: The first electronic device sends a sounding signal to the third electronic device at intervals of a preset time period. The third electronic device may return a response signal. The first electronic device may determine, based on signal strength of the received response signal, whether the first electronic device is far away from the third electronic device. Alternatively, the first electronic device may determine a motion status of the first electronic device by using a motion sensor of the first electronic device. When the first electronic device determines that a quantity of movement steps exceeds a preset quantity of steps, the first electronic device may determine that the first electronic device is far away from the third electronic device.

In this way, when the third electronic device shares the screen, the first user of the first electronic device may view the screen of the third electronic device without staying beside the third electronic device, and explain, to the second user of the second electronic device, content displayed on the screen of the third electronic device. This greatly improves screen sharing flexibility.

According to a second aspect, an embodiment of this application provides a screen sharing system. The system may include a first electronic device, a second electronic device, a third electronic device, and a fourth electronic device. The first electronic device establishes a video communication connection to the second electronic device. The first electronic device may be configured to display a first interface, where a first video stream is played on the first interface, and the first video stream may be collected by the second electronic device by using a camera during the video communication connection. The second electronic device may be configured to display a second interface, where a second video stream is played on the second interface, and the second video stream may be collected by the first electronic device by using a camera during the video communication connection. The third electronic device may be configured to send a third video stream to the first electronic device, where the third video stream includes content on a screen of the third electronic device. The first electronic device may be further configured to send the third video stream to the second electronic device after receiving the third video stream. The second electronic device may be further configured to send a fourth video stream to the fourth electronic device after receiving the third video stream, where the fourth video stream includes content on the screen of the third electronic device. The fourth electronic device may be configured to play the fourth video stream.

With reference to the second aspect, after receiving the third video stream, the second electronic device may be further configured to: play the second video stream in a display area A of the second interface, and play the third video stream in a display area B of the second interface.

In some embodiments, the fourth video stream may be the third video stream. In other words, the second electronic device may directly forward the received third video stream to the fourth electronic device.

Alternatively, the fourth video stream may include the third video stream and the second video stream. In other words, the second electronic device may send the third video stream and the second video stream to the fourth electronic device. The fourth electronic device may play the third video stream and the second video stream.

In a possible implementation, the fourth video stream may be a third video stream obtained after adjustment such as resolution compression and/or format conversion. Alternatively, the fourth video stream may include a third video stream obtained after adjustment such as resolution compression and/or format conversion and a second video stream obtained after adjustment such as resolution compression and/or format conversion.

With reference to the second aspect, an example in which the fourth video stream is the third video stream or includes the third video stream is used. When the fourth electronic device plays the third video stream, the second electronic device may be further configured to cancel playing of the third video stream on the second interface.

Further, after the fourth electronic device cancels playing of the third video stream, the second electronic device may play the third video stream on the second interface.

In some embodiments, the fourth video stream may be obtained by the second electronic device by performing screen recording when the second electronic device plays the third video stream.

In some embodiments, during the video communication connection between the first electronic device and the second electronic device, the first electronic device may send a screen recording instruction to the third electronic device, where the screen recording instruction may instruct the third electronic device to perform screen recording and obtain the third video stream.

In this way, a first user of the first electronic device and a second user of the second electronic device may perform video communication by using the first electronic device and the second electronic device respectively. During the video communication, the first user may share the screen of the third electronic device (such as a mobile phone, a tablet, a television, or a notebook computer) near the first user with the second electronic device. The second user may view, by using the second electronic device, the screen shared by the first user. The second user may further switch the screen shared by the first user to the fourth electronic device (such as a mobile phone, a tablet, a television, or a notebook computer) near the second user for display. In this way, screen sharing between electronic devices is more flexible, shareable content is not limited to electronic devices that establish a video communication connection, and an electronic device having no video communication capability can also perform screen sharing by using an electronic device that establishes a video communication connection.

With reference to the second aspect, the first electronic device may include an audio/video communications application and a screen sharing module. The second electronic device may include an audio/video communications application and a screen sharing module. The first electronic device and the second electronic device may establish the video communication connection by using the audio/video communications applications respectively.

Specifically, the audio/video communications application may include a second shared memory, a third shared memory, a camera collection module, and a video processing module. When the first electronic device and the second electronic device establish the video communication connection, the camera collection module of the first electronic device may store, in the second shared memory of the first electronic device, the second video stream collected by the camera, and send the second video stream to the video processing module of the first electronic device. The video processing module of the first electronic device may encode the second video stream in a video encoding format negotiated by the first electronic device and the second electronic device, and send the encoded second video stream to the video processing module of the second electronic device. The video processing module of the second electronic device may decode the received encoded second video stream, and store the second video stream in the third shared memory of the second electronic device. The camera collection module of the second electronic device may store, in the second shared memory of the second electronic device, the first video stream collected by the camera, and send the first video stream to the video processing module of the second electronic device. The video processing module of the second electronic device may encode the first video stream in a video encoding format negotiated by the first electronic device and the second electronic device, and send the encoded first video stream to the video processing module of the first electronic device. The video processing module of the first electronic device may decode the received encoded first video stream, and store the first video stream in the third shared memory of the first electronic device.

The first electronic device may play, in different display areas of the first interface, the second video stream stored in the second shared memory of the first electronic device and the first video stream stored in the third shared memory. The second electronic device may play, in different display areas of the second interface, the first video stream stored in the second shared memory of the second electronic device and the second video stream stored in the third shared memory.

The screen sharing module may be configured to: perform screen recording to obtain a video stream, and encode or decode the video stream. The third electronic device and the fourth electronic device each include a screen sharing module. The audio/video communications application of each of the first electronic device and the second electronic device may further include a service interface and a first shared memory. The service interface of the first electronic device may be configured to send an address of the first shared memory of the first electronic device to the screen sharing module of the first electronic device. The service interface of the second electronic device may be configured to send an address of the first shared memory of the second electronic device to the screen sharing module of the second electronic device.

In response to a first user operation of sharing the screen of the third electronic device with the second electronic device, the screen sharing module of the third electronic device may perform screen recording, and send the obtained third video stream to the screen sharing module of the first electronic device. The screen sharing module of the first electronic device may store the third video stream in the first shared memory. Further, the video processing module of the first electronic device may obtain the third video stream from the first shared memory, and send the third video stream to the video processing module of the second electronic device. The video processing module of the second electronic device may store the third video stream in the first shared memory of the second electronic device. The second electronic device may play the third video stream in the first shared memory of the second electronic device on the second interface.

In response to a second user operation of sharing, with the fourth electronic device, the screen shared by the third electronic device, the screen sharing module of the second electronic device may obtain the third video stream from the first shared memory of the second electronic device, and send the third video stream to the screen sharing module of the fourth electronic device. The fourth electronic device may play the third video stream.

According to a third aspect, an embodiment of this application provides another screen sharing method. The method includes: A second electronic device may establish a video communication connection to a first electronic device. The second electronic device may collect a first video stream by using a camera during the video communication connection, where the first video stream is played on a first interface of the first electronic device. The second electronic device may display a second interface, where a second video stream is played on the second interface, and the second video stream may be collected by the first electronic device by using a camera during the video communication connection. The second electronic device may send a fourth video stream to a fourth electronic device after receiving a third video stream from the first electronic device, where the third video stream of the first electronic device is sent by a third electronic device to the first electronic device, the third video stream includes content on a screen of the third electronic device, the fourth video stream includes content on the screen of the third electronic device, and the fourth video stream may be played on the fourth electronic device.

With reference to the third aspect, after the second electronic device receives the third video stream from the first electronic device, the second electronic device may play the second video stream in a display area A of the second interface, and play the third video stream in a display area B of the second interface.

In some embodiments, the fourth video stream may be the third video stream. Alternatively, the fourth video stream may include the third video stream and the second video stream.

When the fourth electronic device plays the third video stream, the second electronic device may cancel playing of the third video stream on the second interface.

Further, after the fourth electronic device cancels playing of the third video stream, the second electronic device may play the third video stream on the second interface.

In some embodiments, the fourth video stream may be obtained by the second electronic device by performing screen recording when the second electronic device plays the third video stream.

According to a fourth aspect, an embodiment of this application provides an electronic device. The electronic device includes a camera, a touchscreen, a communications module, a memory, and a processor. The communications module may be configured to establish a video communication connection to a first electronic device. The camera may be configured to collect a first video stream during the video communication connection, where the first video stream is played on a first interface of the first electronic device. The touchscreen may be configured to display a second interface, where a second video stream is played on the second interface, and the second video stream is collected by the first electronic device by using a camera during the video communication connection. The communications module may be further configured to: receive a third video stream from the first electronic device, and send a fourth video stream to a fourth electronic device, where the third video stream of the first electronic device is sent by a third electronic device to the first electronic device, the third video stream includes content on a screen of the third electronic device, the fourth video stream includes content on the screen of the third electronic device, and the fourth video stream is played on the fourth electronic device. The memory may be configured to store the first video stream, the second video stream, and the third video stream, and is further configured to store a computer program. The processor may be configured to invoke the computer program, so that the electronic device performs any possible implementation of the third aspect.

According to a fifth aspect, an embodiment of this application provides a chip. The chip is applied to an electronic device. The chip includes one or more processors. The processor is configured to invoke computer instructions, so that the electronic device performs any possible implementation of the third aspect.

According to a sixth aspect, an embodiment of this application provides a computer program product including instructions. When the computer program product runs on a device, the electronic device is enabled to perform any possible implementation in the third aspect.

According to a seventh aspect, an embodiment of this application provides a computer-readable storage medium, including instructions. When the instructions are run on an electronic device, the electronic device is enabled to perform any possible implementation of the third aspect.

It can be understood that the electronic device according to the fourth aspect, the chip according to the fifth aspect, the computer program product according to the sixth aspect, and the computer-readable storage medium according to the seventh aspect are all configured to perform the methods provided in embodiments of this application. Therefore, for beneficial effects that can be achieved, refer to beneficial effects in a corresponding method. Details are not described herein again.

BRIEF DESCRIPTION OF DRAWINGS

FIG. 6A and FIG. 6B are a flowchart of a method for performing screen sharing by an electronic device according to an embodiment of this application;

DESCRIPTION OF EMBODIMENTS

Figure 1:
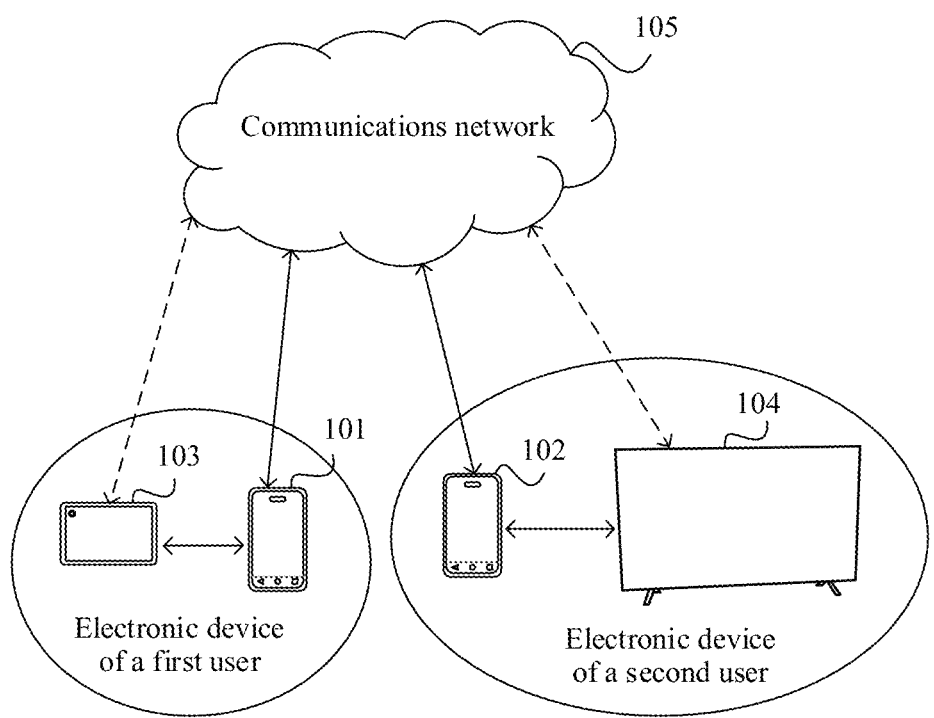
FIG. 1 is a schematic diagram of a structure of a communications system according to an embodiment of this application.

Terms used in the following embodiments of this application are merely intended to describe specific embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any one or all of possible combinations of one or more listed items.

Currently, in a plurality of electronic devices that perform video communication, one electronic device may share content displayed on a screen of the electronic device with another electronic device. For example, a first electronic device establishes a video communication connection to a second electronic device. The first electronic device may collect an image by using a camera, display, on a screen, the image collected by the camera, and send the image to the second electronic device. The first electronic device may further display, on the screen, an image collected by a camera of the second electronic device. Similarly, the second electronic device may collect an image by using the camera, and display the image on the screen. The second electronic device may further display, on the screen, an image collected by the camera of the first electronic device.

In response to a user operation of sharing the screen of the first electronic device, the first electronic device may perform screen recording and obtain a screen stream of the first electronic device. The screen stream may be used to display content displayed on the screen of the first electronic device, for example, a text or an icon displayed on the screen, a user interface jump on the screen, and a mark made by a user on a user interface. The first electronic device may send the screen stream obtained through real-time recording to the second electronic device. When receiving the screen stream from the first device, the second electronic device may receive and display an image included in the screen stream on the screen. In this way, during video communication, the first electronic device may share the screen of the first electronic device with the second electronic device.

In the foregoing screen sharing solution, shareable content is limited to the first electronic device and the second electronic device that establish the video communication connection. Consequently, screen sharing between electronic devices is not flexible enough. In some scenarios, content that a user of the first electronic device wants to share may be content displayed by another device (for example, a third electronic device) near the first electronic device. In these scenarios, because the third electronic device does not establish a video communication connection to the second electronic device, content displayed on a screen of the third electronic device may not be shared with the second electronic device. Alternatively, the third electronic device first sends related content to the first electronic device. Further, the first electronic device displays the content on the screen and then shares the screen with the second electronic device. In this way, content displayed on the third electronic device is shared with the second electronic device. It can be learned that, in a scenario in which content that needs to be shared is not on an electronic device to which a video communication connection has been established, a user cannot perform sharing, or a sharing operation is cumbersome.

Based on the foregoing problem, this application provides a screen sharing method. In the method, a first electronic device may establish a video communication connection to a second electronic device. In response to a user operation of sharing a screen of a third electronic device, the first electronic device may establish a communication connection to the third electronic device. The third electronic device may perform screen recording, and send an obtained screen stream of the third electronic device to the first electronic device. When receiving the screen stream of the third electronic device, the first electronic device may send the screen stream to the second electronic device through the video communication connection. Further, the second electronic device may display an image in the screen stream of the third electronic device. In addition, the second electronic device may further send the screen stream of the third electronic device to a fourth electronic device. The fourth electronic device may display the image in the screen stream of the third electronic device. The third electronic device may be an electronic device near the first electronic device. The fourth electronic device may be an electronic device near the second electronic device.

The first electronic device may simultaneously send an image collected by a camera of the first electronic device and the screen stream of the third electronic device to the second electronic device.

The second electronic device may display the image collected by the camera of the first electronic device and the image included in the screen stream of the third electronic device.

In addition, the second electronic device may further send the screen stream of the third electronic device to the fourth electronic device. After sending the screen stream of the third electronic device to the fourth electronic device, the second electronic device may display the image collected by the camera of the first electronic device and an image collected by a camera of the second electronic device. Alternatively, the second electronic device may still display the image collected by the camera of the first electronic device and the image included in the screen stream of the third electronic device.

When receiving the screen stream of the third electronic device, the fourth electronic device may display the image included in the screen stream of the third electronic device.

In the screen sharing method provided in this application, shareable content is not limited to electronic devices that establish a video communication connection. In electronic devices that perform video communication, one electronic device may share a screen of an electronic device near the electronic device with an electronic device at a video communication peer end. The electronic device at the video communication peer end may display an image included in a received screen stream, and may further send the screen stream to an electronic device near the electronic device at the video communication peer end, so that the electronic device near the electronic device at the video communication peer end displays the image included in the received screen stream. In this way, screen sharing between electronic devices is more flexible, and an electronic device having no video communication capability can also perform screen sharing by using an electronic device that establishes a video communication connection. In addition, shared content may be further displayed on another electronic device in addition to an electronic device to which a video communication connection is established. Therefore, a user of the second electronic device may use the second electronic device to perform video communication, and may also use the fourth electronic device to view content that is shared by the third electronic device and displayed on the screen of the third electronic device.

The screen sharing method provided in this application may be applied to a communications system 100. The following specifically describes the communications system 100.

As shown in FIG. 1, the communications system 100 may include N electronic devices, where N is an integer greater than 1. For example, the communications system 100 may include a first electronic device 101, a second electronic device 102, a third electronic device 103, and a fourth electronic device 104. The communications system 100 may further include a communications network 105. The N electronic devices in the communications system 100 may be connected to the communications network 105. The N electronic devices may establish a communication connection through the communications network 105.

The communications network 105 may be a wired network, or may be a wireless network. For example, the communications network 105 may be a local area network (local area network, LAN), or may be a wide area network (wide area networks, WAN). The communications network 105 may be implemented by using a network communications protocol in the conventional technology, or implemented by a future network communications protocol. The foregoing network communications protocol may be various wired or wireless communications protocols, for example, the Ethernet, a universal serial bus (universal serial bus, USB), a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), Bluetooth, wireless fidelity (wireless fidelity, Wi-Fi), near field communication (near field communication, NFC), voice over internet protocol (voice over Internet protocol, VoIP), a communications protocol that supports a network slicing architecture, and any other suitable communications protocols. The communications network 105 may alternatively be implemented by using a network communications protocol in a future technology. This is not limited in this embodiment of this application.

For example, in some embodiments, the first electronic device 101 may establish a network connection to the second electronic device 102 by using a Wi-Fi protocol.

The first electronic device 101, the second electronic device 102, the third electronic device 103, and the fourth electronic device 104 may establish a video communication connection through the communications network 105. In other words, the N electronic devices in the communications system 100 may perform video communication through the communications network 105. For example, the first electronic device 101 may perform video communication with the second electronic device 102, the third electronic device 103, and the fourth electronic device 104.

It should be noted that the first electronic device 101 and the third electronic device 103 may be electronic devices of a first user. The third electronic device 103 may be near the first electronic device 101. Communication between the first electronic device 101 and the third electronic device 103 may be short-range communication. For example, the first electronic device 101 and the third electronic device 103 may be located in a same local area network. Specifically, the first electronic device 101 and the third electronic device 103 are connected to a same Wi-Fi. The two electronic devices may transmit data to each other based on the Wi-Fi direct (Wi-Fi direct) protocol. Not limited to short-distance communication, communication between the first electronic device 101 and the third electronic device 103 may alternatively be long-distance communication. This is not limited in this embodiment of this application.

The second electronic device 102 and the fourth electronic device 104 may be electronic devices of a second user. The fourth electronic device 104 may be near the second electronic device 102. Communication between the second electronic device 102 and the fourth electronic device 104 may be short-range communication. For example, the second electronic device 102 and the fourth electronic device 104 may be located in a same local area network. Not limited to short-distance communication, communication between the second electronic device 102 and the fourth electronic device 104 may alternatively be long-distance communication. This is not limited in this embodiment of this application.

The first electronic device 101 may establish a video communication connection to the second electronic device 102 through the communications network 105. The first electronic device 101 may send an image collected by a camera to the second electronic device 102 through the communications network 105. The second electronic device 102 may send an image collected by a camera to the first electronic device 101 through the communications network 105.

The first electronic device 101 may establish a communication connection to the third electronic device 103. The first electronic device 101 may obtain a screen stream from the third electronic device 103, and send the screen stream to the second electronic device 102. The second electronic device 102 may display an image included in the screen stream. The second electronic device 102 may further send the screen stream to the fourth electronic device 104. The fourth electronic device 104 may display the image included in the screen stream.

Not limited to a manner of transmitting data based on a Wi-Fi direct protocol, a manner of transmitting data between the first electronic device 101 and the third electronic device 103 and a manner of transmitting data between the second electronic device 102 and the fourth electronic device 104 each may alternatively be a manner of transmitting data based on another network communications protocol. This is not limited in this embodiment of this application.

The first electronic device 101, the second electronic device 102, the third electronic device 103, and the fourth electronic device 104 each may be specifically a mobile phone, a tablet computer, a television, a wearable electronic device, a head unit, a notebook computer, a handheld computer, a netbook, a personal digital assistant (personal digital assistant, PDA), or the like. This is not limited in this embodiment of this application.

Figure 2:
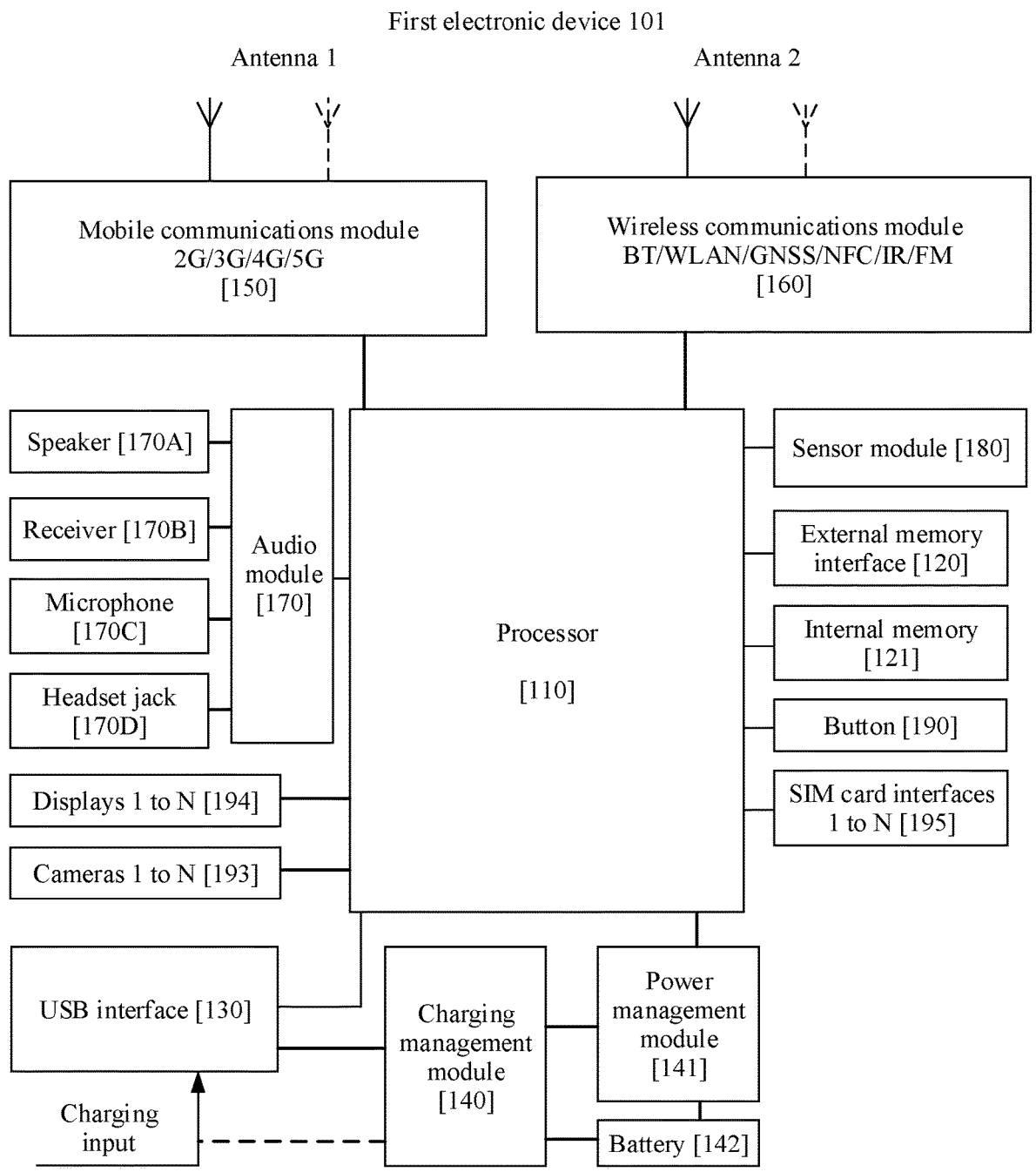
FIG. 2 is a schematic diagram of a structure of a first electronic device according to an embodiment of this application.

The first electronic device 101 is used as an example. FIG. 2 is a schematic diagram of an example of a structure of the first electronic device 101.

The first electronic device 101 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a camera 193, a display 194, a subscriber identity module (subscriber identity module, SIM) card interface 195, and the like.

It can be understood that the structure shown in this embodiment of the present invention does not constitute a specific limitation on the first electronic device 101. In some other embodiments of this application, the first electronic device 101 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

A memory may be further disposed in the processor 110, and is configured to store instructions and data. In some embodiments, the memory in the processor 110 is a cache. The memory may store an instruction or data that has been used or cyclically used by the processor 110. If the processor 110 needs to use the instruction or the data again, the processor may directly invoke the instruction or the data from the memory. This avoids repeated access, reduces a waiting time of the processor 110, and improves system efficiency.

The USB interface 130 is an interface that conforms to a USB standard specification, and may be specifically a mini USB interface, a micro USB interface, a USB Type-C interface, or the like. The USB interface 130 may be configured to connect to a charger to charge the first electronic device 101, or may be configured to transmit data between the first electronic device 101 and a peripheral device, or may be configured to connect to a headset to play audio by using the headset, or may be configured to connect to another electronic device such as an AR device.

The charging management module 140 is configured to receive a charging input from the charger. The charger may be a wireless charger or a wired charger. The charging management module 140 supplies power to the electronic device through the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communications module 160, and the like.

A wireless communication function of the first electronic device 101 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the first electronic device 101 may be configured to cover a single communication band or a plurality of communication bands. Different antennas may be further multiplexed, to improve antenna utilization.

The mobile communications module 150 may provide a solution, applied to the first electronic device 101, to wireless communication including 2G, 3G, 4G, 5G, or the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The wireless communications module 160 may provide a solution, applied to the first electronic device 101, to wireless communication including a wireless local area network (wireless local area network, WLAN) (for example, Wi-Fi), Bluetooth (Bluetooth, BT), a global navigation satellite system (global navigation satellite system, GNSS), frequency modulation (frequency modulation, FM), NFC, an infrared (infrared, IR) technology, or the like in the conventional technology or in a future technology. This is not limited in this embodiment of this application.

The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave through the antenna 2 for radiation.

The first electronic device 101 implements a display function through the GPU, the display 194, the application processor, and the like. The GPU is a microprocessor for image processing, and is connected to the display 194 and the application processor. The GPU is configured to: perform mathematical and geometric calculation, and perform graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the first electronic device 101 may include one or N displays 194, where N is a positive integer greater than 1.

In this application, the display 194 may also be referred to as a "touchscreen" or a "screen".

The first electronic device 101 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image.

The camera 193 is configured to capture a static image or a video. An optical image of an object is generated through the lens, and is projected onto the photosensitive element. The photosensitive element may be a charged coupled device (charged coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the first electronic device 101 may include one or N cameras 193, where N is a positive integer greater than 1.

The digital signal processor is configured to process a digital signal, and may process another digital signal in addition to the digital image signal. For example, when the first electronic device 101 selects a frequency, the digital signal processor is configured to perform Fourier transform on frequency energy.

The video codec is configured to compress or decompress a digital video. The first electronic device 101 may support one or more video codecs. Therefore, the first electronic device 101 may play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a mode of transmission between human brain neurons, and may further continuously perform self-learning. The NPU can implement applications such as intelligent cognition of the first electronic device 101, such as image recognition, facial recognition, speech recognition, and text understanding.

The external memory interface 120 may be configured to connect to an external memory card, for example, a micro SD card, to extend a storage capability of the first electronic device 101. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications of the first electronic device 101 and data processing.

The first electronic device 101 may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The first electronic device 101 may listen to music or answer a call in a hands-free mode through the speaker 170A.

The receiver 170B, also referred to as an "earpiece", is configured to convert an audio electrical signal into a sound signal. When the first electronic device 101 answers a call or receives a voice message, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth of the user, to enter a sound signal into the microphone 170C. At least one microphone 170C may be disposed in the first electronic device 101. In some other embodiments, two microphones 170C may be disposed in the first electronic device 101, to collect a sound signal and implement a noise reduction function. In some other embodiments, three, four, or more microphones 170C may alternatively be disposed in the first electronic device 101, to collect a sound signal, implement noise reduction, identify a sound source, and implement a directional recording function and the like.

The button 190 includes a power button, a volume button, and the like. The button 190 may be a mechanical button, or may be a touch button. The first electronic device 101 may receive a key input, and generate a key signal input related to user settings and function control of the first electronic device 101.

The SIM card interface 195 is configured to connect to a SIM card. The SIM card may be inserted into the SIM card interface 195 or removed from the SIM card interface 195, to implement contact with or separation from the first electronic device 101. The first electronic device 101 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or different types. The SIM card interface 195 is compatible with different types of SIM cards. The SIM card interface 195 is also compatible with an external storage card. The first electronic device 101 interacts with a network through the SIM card, to implement a call function, a data communication function, and the like. In some embodiments, the first electronic device 101 uses an eSIM, namely, an embedded SIM card. The eSIM card may be embedded in the first electronic device 101 and cannot be separated from the first electronic device 101.

Not limited to the modules shown in FIG. 2, the first electronic device 101 may further include more or fewer modules.

The schematic diagram of the structure of the first electronic device 101 shown in FIG. 2 may also be a schematic diagram of a structure of each of the second electronic device 102, the third electronic device 103, and the fourth electronic device 104 in this embodiment of this application. A Screen Sharing Method Provided in an Embodiment of this Application is Described Below with Reference to a Specific Scenario.

FIG. 3A to FIG. 3F are schematic diagrams of a series of user interfaces of an electronic device that performs screen sharing in a video communication process according to an embodiment of this application.

Figure 3A:
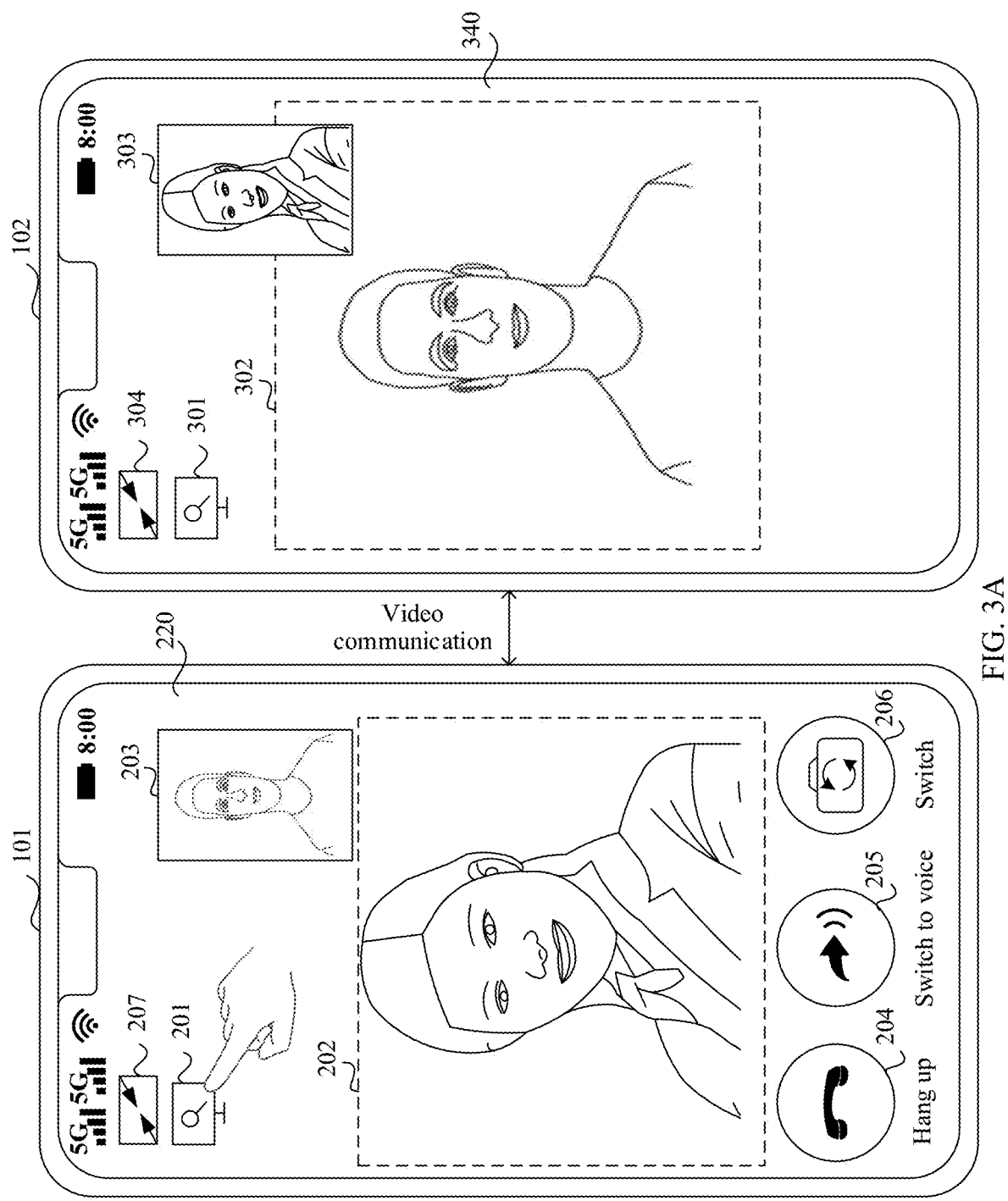
FIG. 3A to FIG. 3F are schematic diagrams of a series of user interfaces of an electronic device during screen sharing according to an embodiment of this application.
Figure 3B:
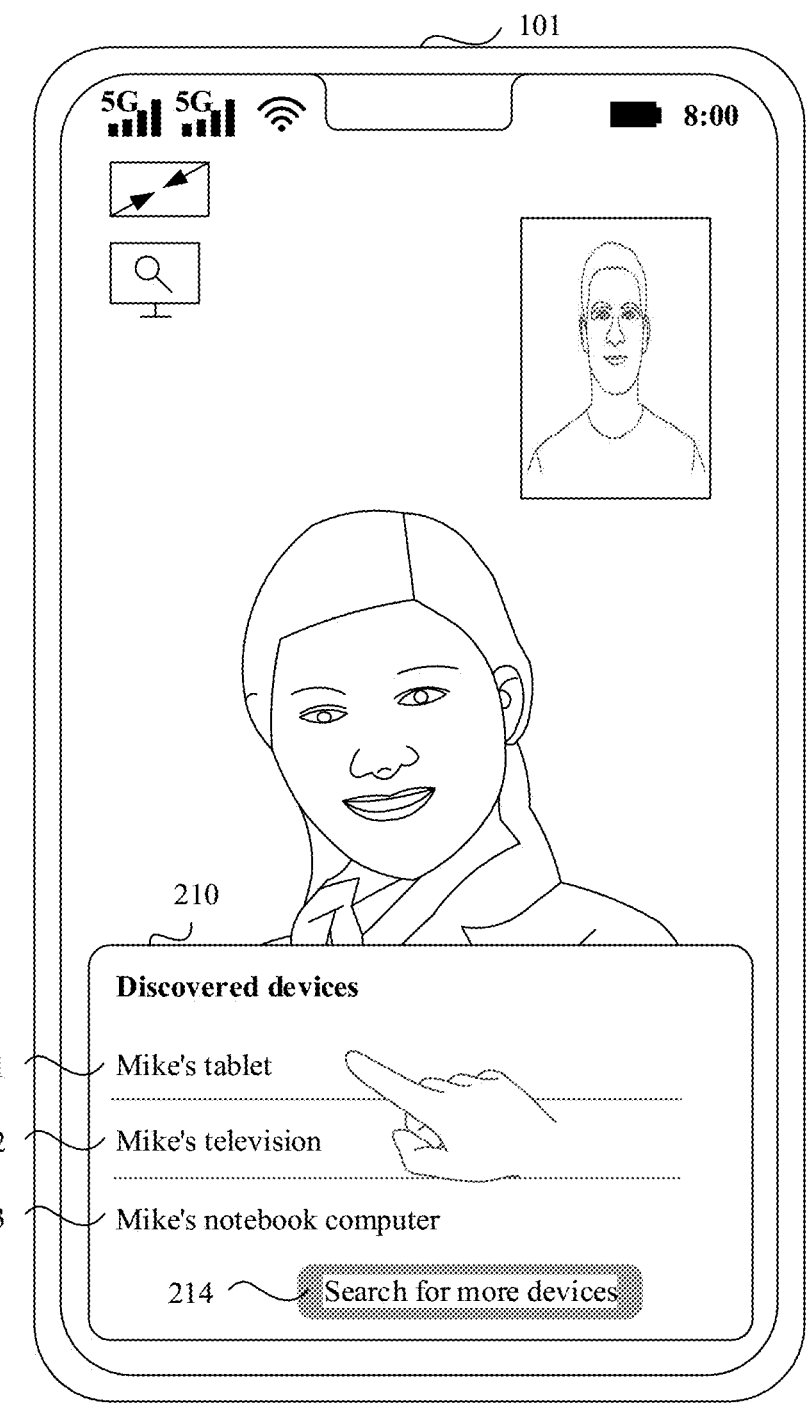
Figure 3C:
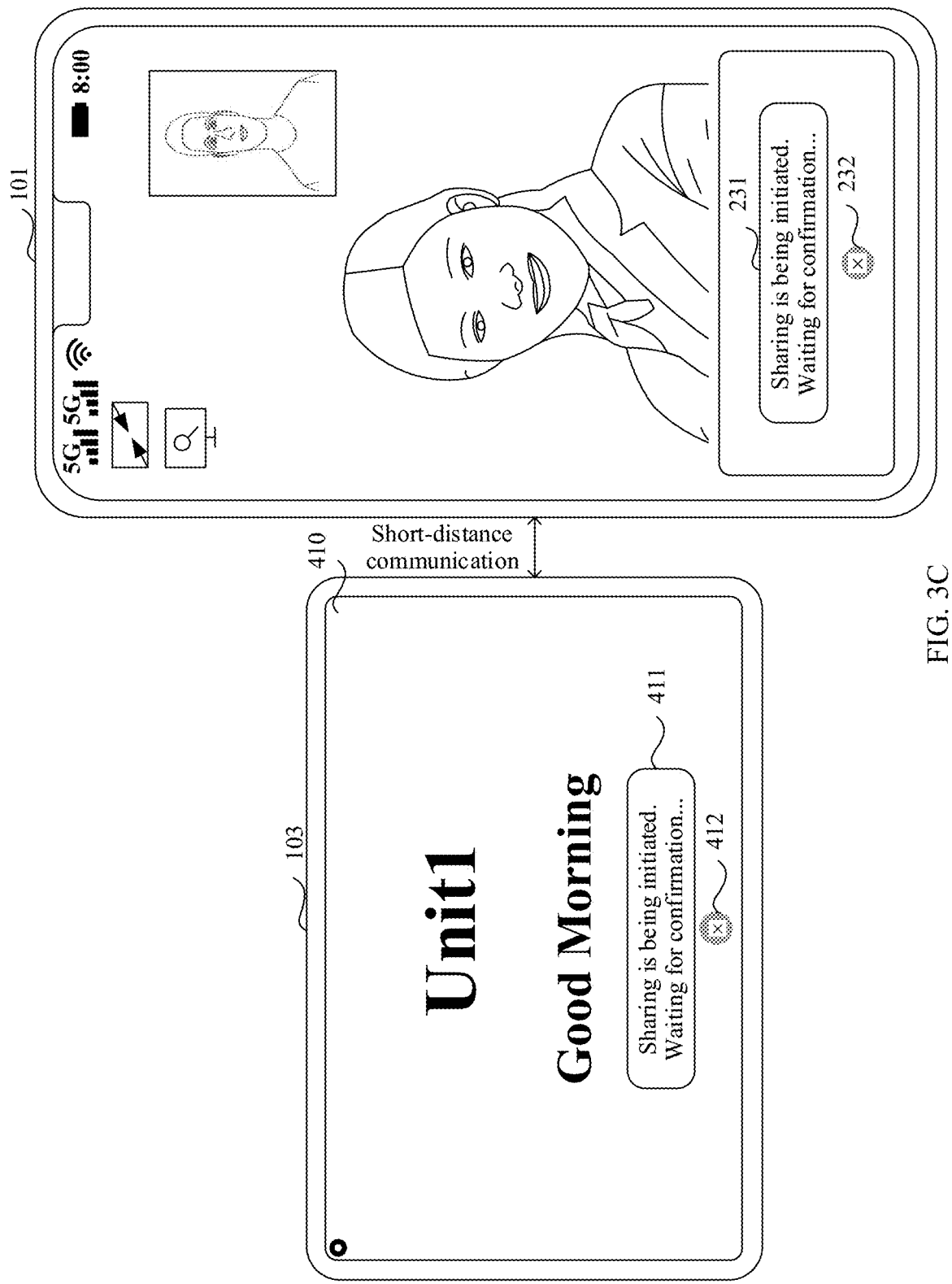

FIG. 3A to FIG. 3C are schematic diagrams of examples of user interfaces displayed when a first electronic device 101 sends a screen sharing request to a second electronic device 102 in a video communication process. A shared screen is a screen of a third electronic device 103.

FIG. 3D and FIG. 3E-1 to FIG. 3E-3 are schematic diagrams of examples of user interfaces displayed when the second electronic device 102 determines to accept the screen sharing request of the first electronic device 101.

Figure 3D:
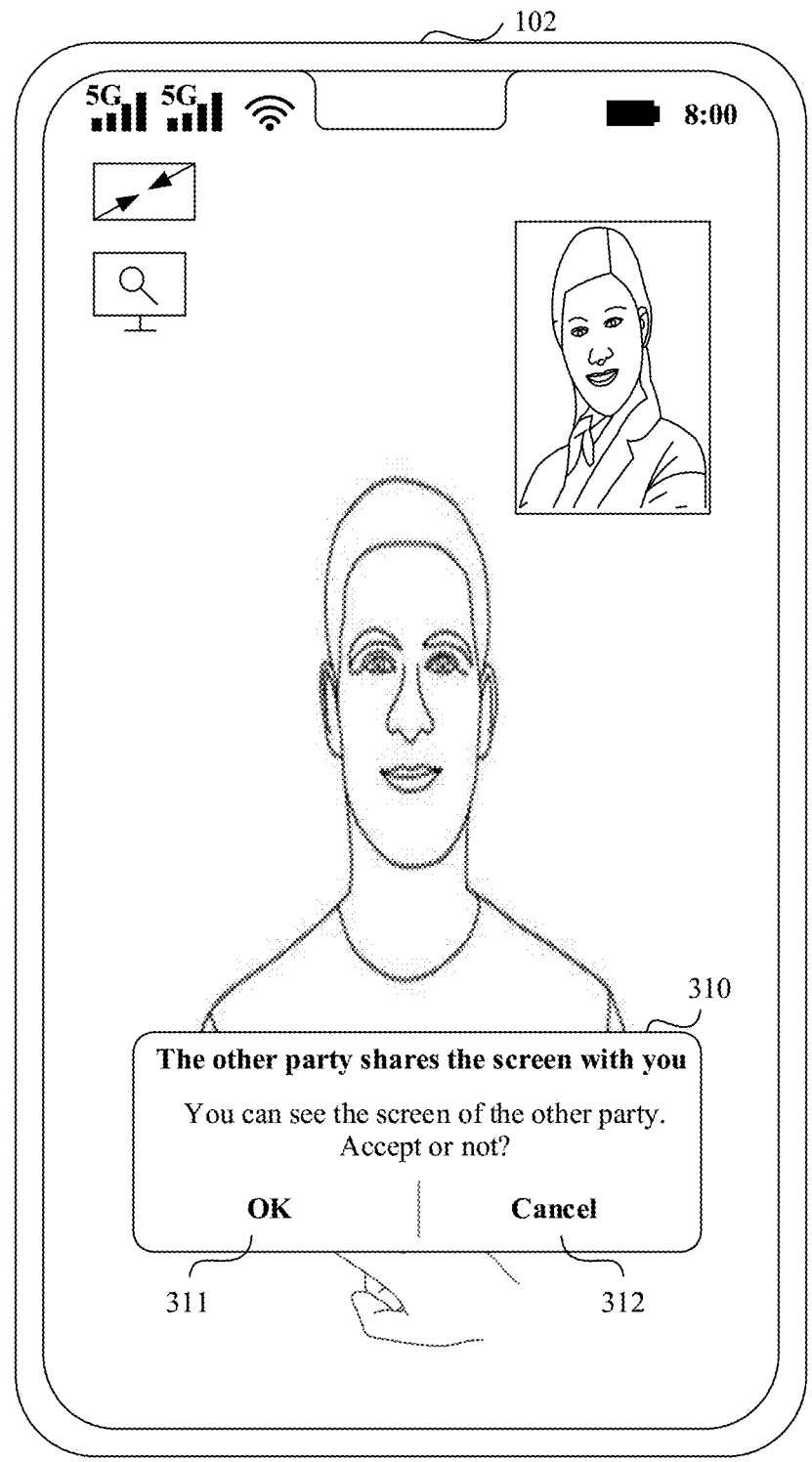
Figures 1, 3E:
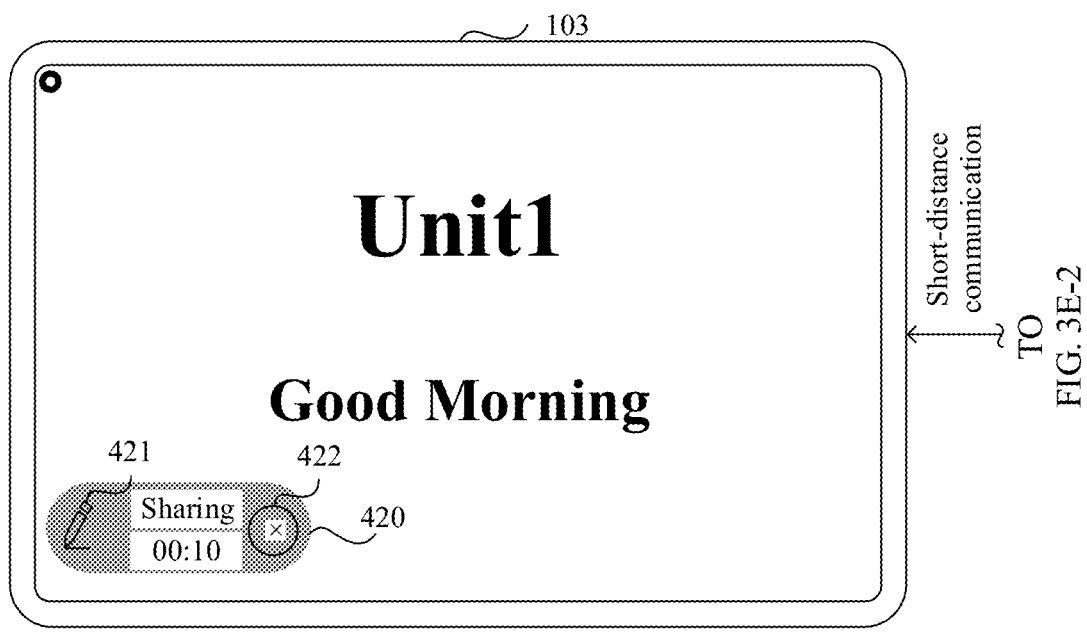
Figures 2, 3E:
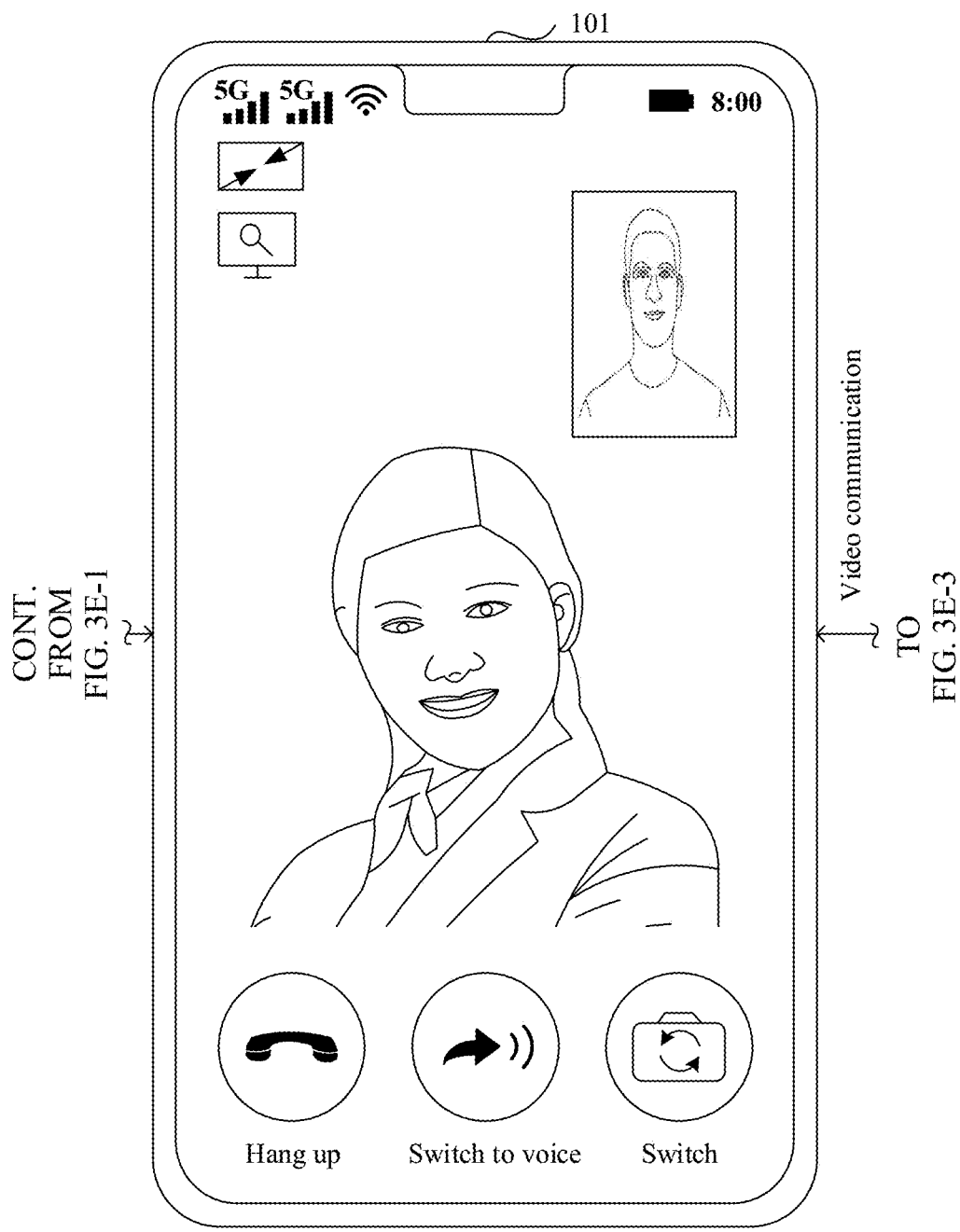
Figures 3, 3E:
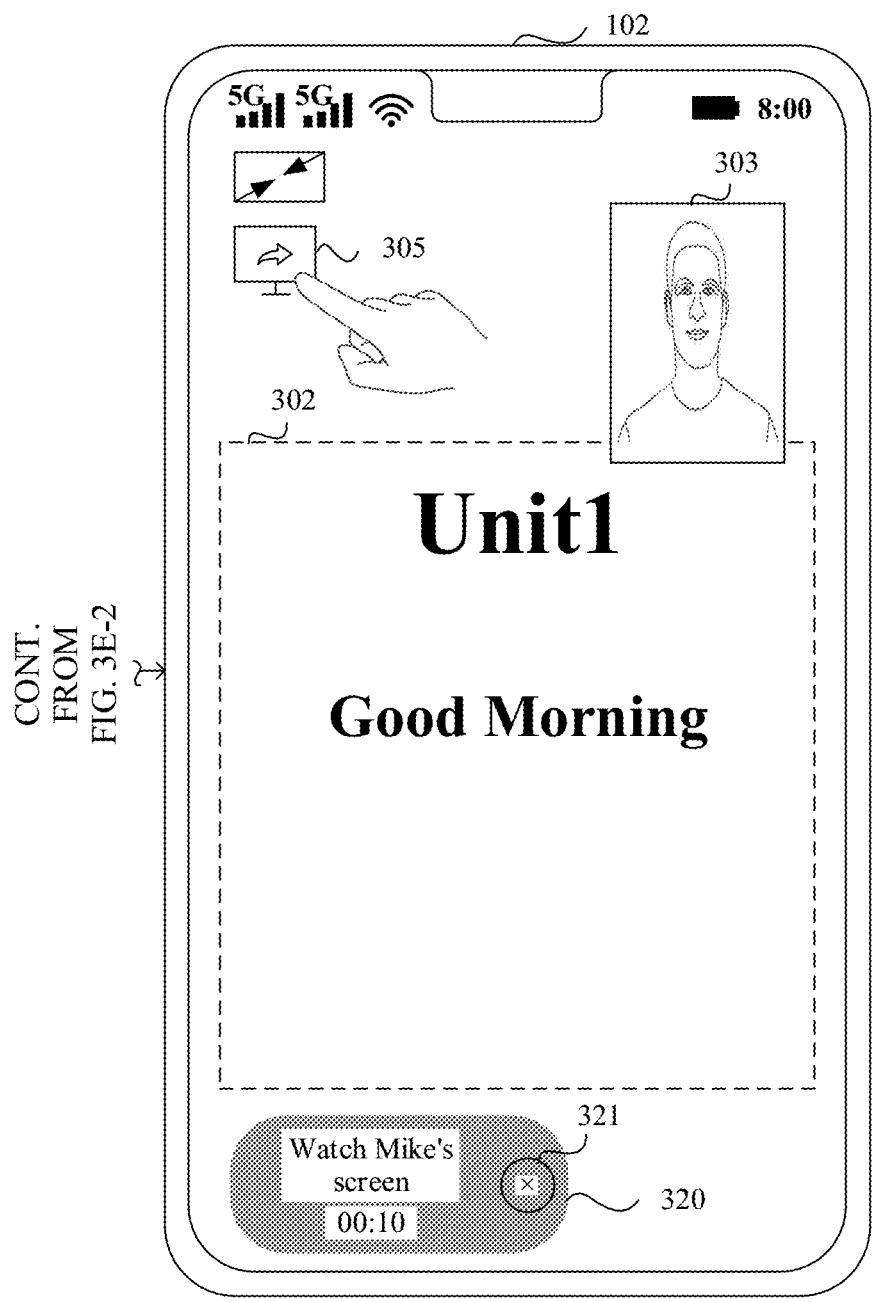
Figure 3F:
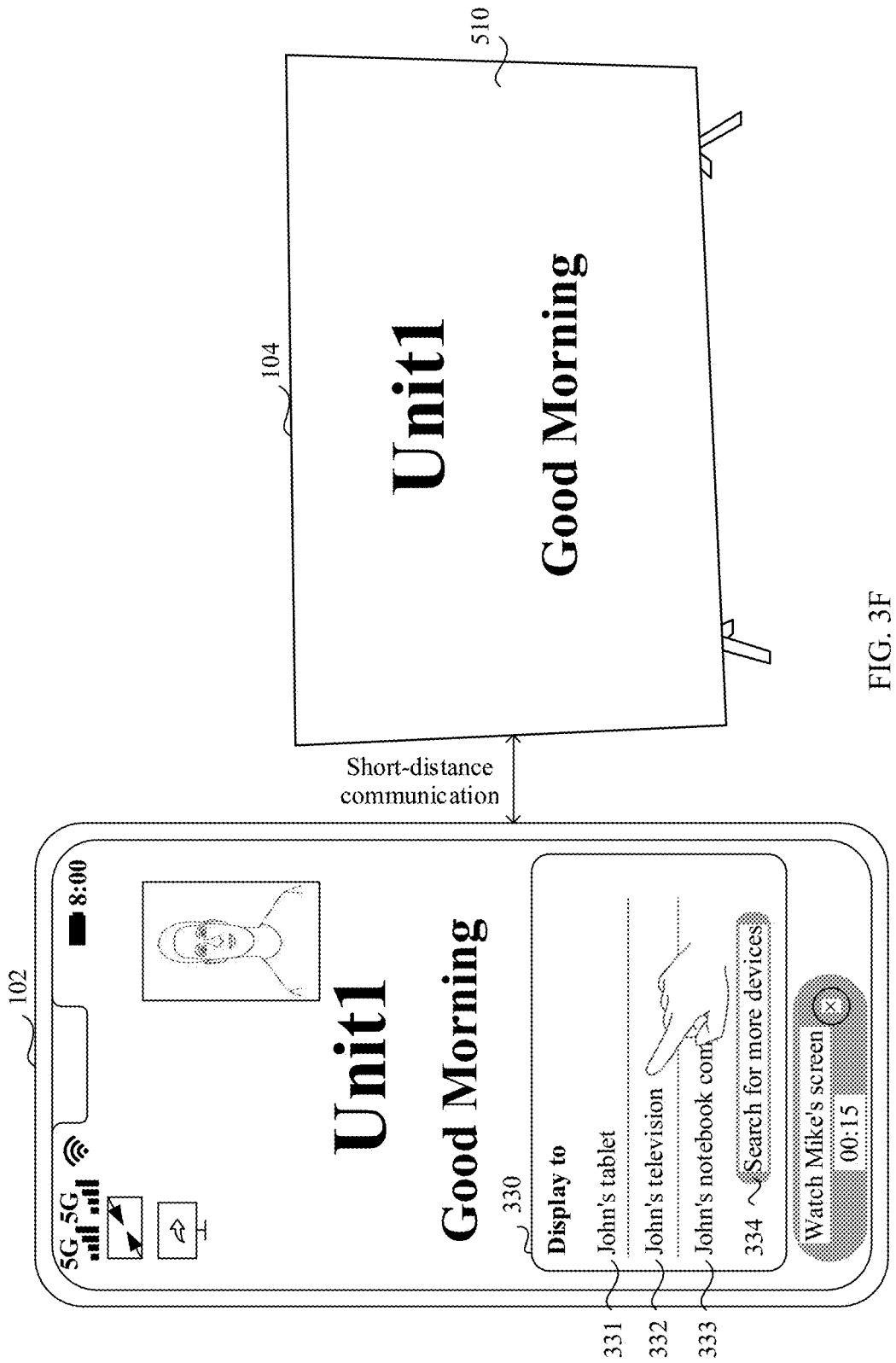

FIG. 3F is a schematic diagram of an example of a user interface displayed when the second electronic device 102 switches a received shared screen to a fourth electronic device 104 for display.

1. In the Video Communication Process, the First Electronic Device 101 May Send the Screen Sharing Request to the Second Electronic Device 102. The Shared Screen is the Screen of the Third Electronic Device 103.

As shown in FIG. 3A, the first electronic device 101 may be an electronic device (such as a mobile phone) of a first user. The second electronic device 102 may be an electronic device (such as a mobile phone) of a second user. The first electronic device 101 establishes a video communication connection to the second electronic device 102. The first electronic device 101 may collect a first camera video stream by using a camera (for example, a front-facing camera), and send the first camera video stream to the second electronic device 102. The second electronic device 102 may collect a second camera video stream by using a camera (for example, a front-facing camera), and send the second camera video stream to the first electronic device 101.

The first electronic device 101 may display a call interface 220. The second electronic device 102 may display a call interface 340. The call interface 220 may include a device discovery control 201, a first display area 202, a second display area 203, a "Hang up" control 204, a "Switch to voice" control 205, a camera switch control 206, and a minimization control 207. The call interface 340 may include a device discovery control 301, a third display area 302, a fourth display area 303, and a minimization control 304.

On the call interface 220 of the first electronic device 101, the first display area 202 may be used to display an image (for example, an image including the face of the second user) included in the second camera video stream, and the second display area 203 may be used to display an image (for example, an image including the face of the first user) included in the first camera video stream. Content displayed in the first display area 202 and content displayed in the second display area 203 may be interchanged. For example, in response to a user operation performed on the first display area, for example, a touch operation, the first electronic device 101 may display the image included in the first camera video stream in the first display area, and display the image included in the second camera video stream in the second display area.

The user operation of interchanging the content displayed in the first display area 202 and the content displayed in the second display area 203 is not limited in this embodiment of this application.

A size of the first display area 202 is not limited to that shown in FIG. 3A, and may be the same as that of an area that can be used for display on a screen of the first electronic device 101. This is not limited in this embodiment of this application.

A location of the second display area 203 is not limited to that shown in FIG. 3A. In response to a user operation of moving the location of the second display area 203, the first electronic device 101 may move the location of the second display area 203 to a location specified by the user operation.

The "Hang up" control 204 may be configured to hang up a call. In response to a user operation performed on the "Hang up" control 204, for example, a touch operation, the first electronic device 101 may disconnect a video communication connection to the second electronic device 102.

The "Switch to voice" control 205 may be configured to switch the video communication connection to an audio communication connection. In response to a user operation performed on the "Switch to voice" control 205, for example, a touch operation, both the first electronic device 101 and the second electronic device 102 may turn off respective cameras, and do not transmit the first camera video stream and the second camera video stream to respective communication peer ends. The first electronic device 101 and the second electronic device 102 each may transmit a voice input collected by a microphone to the communication peer end. In this way, the first user and the second user can perform audio communication.

The camera switch control 206 may be configured to switch a camera that collects the first camera video stream. For example, a camera currently used to collect the first camera video stream is a front-facing camera of the first electronic device 101. In response to a user operation performed on the camera switch control, for example, a touch operation, the first electronic device 101 may turn off the front-facing camera and turn on a rear-facing camera. The first electronic device 101 may collect the first camera video stream by using the rear-facing camera, and send the first camera video stream to the second electronic device 102.

The minimization control 207 may be configured to minimize the call interface 220. For example, in response to a user operation performed on the minimization control 207, for example, a touch operation, the first electronic device 101 may use the second display area 203 as a call interface. To be specific, a size of the call interface may be the same as that of the second display area, and the call interface is displayed on the screen of the first electronic device 101 in a form of a floating window. The call interface on which the minimization operation is performed may be configured to display the second camera video stream from the second electronic device.

The device discovery control 201 may be configured to search for an electronic device near the first electronic device 101. In response to a user operation performed on the device discovery control 201, for example, a touch operation, the first electronic device 101 may search for the nearby electronic device, for example, an electronic device that is in a same local area network as the first electronic device 101. The first electronic device 101 may further display a user interface shown in FIG. 3B. The user interface shown in FIG. 3B may be configured to display an option of the nearby electronic device found by the first electronic device 101.

The first electronic device 101 may send a broadcast message in a local area network in which the first electronic device 101 is located. If the first electronic device 101 receives replies of one or more electronic devices to the broadcast message, the first electronic device 101 may determine that the one or more electronic devices are found. The one or more electronic devices may establish a communication connection to the first electronic device 101 to exchange data.

The first electronic device 101 and the third electronic device 103 may be electronic devices that are not in a same local area network. For the foregoing specific search manner, refer to an implementation of searching for an electronic device when a communication connection is established based on a Wi-Fi direct protocol in the conventional technology, or an implementation of searching for an electronic device when a connection is established based on another network communications protocol. This is not limited in this embodiment of this application.

On the call interface 340 of the second electronic device 102, the third display area 302 may be used to display the image (for example, the image including the face of the first user) in the first camera video stream from the first electronic device 101. The fourth display area 303 may be used to display the image (for example, the image including the face of the second user) in the second camera video stream. Same as the first display area 202 and the second display area 203, content displayed in the third display area 302 and content displayed in the fourth display area 303 may be interchanged.

A size of the third display area 302 is not limited to that shown in FIG. 3A, and may be the same as that of an area that can be used for display on a screen of the second electronic device 102. This is not limited in this embodiment of this application.

A location of the fourth display area 303 is not limited to that shown in FIG. 3A. In response to a user operation of moving the location of the fourth display area 303, the second electronic device 102 may move the location of the fourth display area 303 to a location specified by the user operation.

For functions of the device discovery control 301 and the minimization control 304, respectively refer to the foregoing descriptions of the device discovery control 201 and the minimization control 207 in the first electronic device 101. The device discovery control 301 may be configured to search for an electronic device near the second electronic device 102. The minimization control 304 may be configured to minimize the call interface 340.

The call interface 220 and the call interface 340 each may include more or fewer controls. This is not limited in this embodiment of this application.

In response to the user operation performed on the device discovery control 201, the first electronic device 101 may display the user interface shown in FIG. 3B. The user interface shown in FIG. 3B may include a device option box 210. The device option box 210 may be used to display an electronic device found by the first electronic device 101. The device option box 210 may further include a "Search for more devices" control 214. The "Search for more devices" control 214 may be used by the first electronic device 101 to continue to search for an electronic device near the first electronic device 101.

For example, electronic devices that are in a same local area network as the first electronic device 101 include Mike's tablet, Mike's television, and Mike's notebook computer. In response to the user operation performed on the device discovery control 201, the first electronic device 101 may find Mike's tablet, Mike's television, and Mike's notebook computer. In this case, the first electronic device 101 may display a "Mike's tablet" option 211, a "Mike's television" option 212, and a "Mike's notebook computer" option 213 in the device option box 210.

In response to a user operation performed on the "Mike's tablet" option 211, for example, a touch operation, the first electronic device 101 may send a request for obtaining a first screen stream to the third electronic device 103 (that is, Mike's tablet), and send a screen sharing request to the second electronic device 102. The first screen stream may be a video stream obtained by the third electronic device 103 by recording the screen of the third electronic device 103, and may include content displayed on the screen of the third electronic device 103.

When receiving, from the first electronic device 101, the request for obtaining the first screen stream, the third electronic device 103 may record the screen to obtain the first screen stream. The third electronic device 103 may send the first screen stream to the first electronic device 101, and display a user interface 410 shown in FIG. 3C. For example, the user interface 410 may display English teaching courseware. The user interface 410 may further include a prompt box 411 and a cancel control 412. The prompt box 411 may be used to prompt that the screen shared by the first user is not accepted by the other party and is waiting for confirmation of the other party. The cancel control 412 may be configured to cancel screen sharing. In response to a user operation performed on the cancel control 412, the third electronic device 103 may stop recording the screen, and send, to the first electronic device 101, a message indicating that screen sharing is canceled. When receiving the message indicating that screen sharing is canceled, the first electronic device 101 may send, to the second electronic device 102, the message indicating that screen sharing is canceled.

The prompt box 411 and the cancel control 412 may be further displayed on the screen of the first electronic device 101. As shown in FIG. 3C, the first electronic device 101 may display a prompt box 231 and a cancel control 232 on the screen. The prompt box 231 may be used to prompt that the screen shared by the first user is not accepted by the other party and is waiting for confirmation of the other party. The cancel control 232 may be configured to cancel screen sharing. In response to a user operation performed on the cancel control 232, the first electronic device 101 may send, to the second electronic device 102 and the third electronic device 103, a message indicating that screen sharing is canceled. When receiving the message indicating that screen sharing is canceled, the third electronic device 103 may stop recording the screen.

2. The Second Electronic Device 102 Determines to Accept the Screen Sharing Request of the First Electronic Device 101.

When receiving the screen sharing request from the first electronic device 101, the second electronic device 102 may display a user interface shown in FIG. 3D. The user interface shown in FIG. 3D may include a prompt box 310. The prompt box 310 may be used to query whether the second user accepts the screen sharing request of the first user. For example, the prompt box 310 may include a prompt message "The other party shares the screen with you. You can see the screen of the other party. Accept or not?" The prompt box 310 may further include an "OK" button 311 and a "Cancel" button 312.

The "OK" button 311 may be configured to determine to accept the screen sharing request of the first electronic device 101. In response to a user operation performed on the "OK" button 311, the second electronic device 102 may send, to the first electronic device 101, a message for determining to receive the screen sharing request. Further, the first electronic device 101 may send, to the second electronic device 102, the first screen stream that is received from the third electronic device 103, and send, to the third electronic device, a message indicating that the screen is being shared. The second electronic device 102 may display a user interface shown in FIG. 3E-1 to FIG. 3E-3.

The "Cancel" button 312 may be configured to refuse to accept the screen sharing request of the first electronic device 101. In response to a user operation performed on the "Cancel" button 312, the second electronic device 102 may send, to the first electronic device, a message for refusing to accept the screen sharing request. Further, the first electronic device 101 may send a screen sharing cancel indication message to the third electronic device. When receiving the screen sharing cancel indication message, the third electronic device 103 may stop recording the screen.

In response to the fact that the message indicating that the screen is being shared is received from the first electronic device 101, the third electronic device 103 may display a user interface shown in FIG. 3E-1. The user interface shown in FIG. 3E-1 may include a "Sharing" prompt box 420. The "Sharing" prompt box 420 may include a prompt message "Sharing" and a screen sharing time length, for example, 10 seconds. The "Sharing" prompt box 420 may be used to indicate that the third electronic device 103 is sharing the screen. The "Sharing" prompt box 420 may further include a graffiti control 421 and a cancel control 422.

The graffiti control 421 may be configured to enable or disable a graffiti function. When the graffiti function is enabled, the first user may make a mark on the screen of the third electronic device 103. For example, when the graffiti function is enabled, in response to a user operation performed on the graffiti control 421, the third electronic device 103 may record a touch trace on the screen, and generate a mark based on the touch trace. When the graffiti function is disabled, in response to a user operation performed on the graffiti control 421, the third electronic device 103 may disable the graffiti function. In other words, the third electronic device 103 may not record a touch trace on the screen.

It should be noted that, when the graffiti function is enabled, the mark generated by the third electronic device 103 based on the touch trace may be included in the first screen stream. In other words, in a screen sharing process, the second user may see, on the second electronic device 102, the mark made by the first user on the screen of the third electronic device 103.

The cancel control 422 may be configured to cancel screen sharing. In response to a user operation performed on the cancel control 422, the third electronic device 103 may stop recording the screen, and send, to the first electronic device 101, a message indicating that screen sharing is canceled. When receiving the message indicating that screen sharing is canceled, the first electronic device 101 may send, to the second electronic device 102, the message indicating that screen sharing is canceled. When receiving the message indicating that screen sharing is canceled, the second electronic device 102 may display the call interface 340 shown in FIG. 3A.

In this embodiment of this application, a time for recording the screen by the third electronic device 103 may start when the request for obtaining the first screen stream is received from the first electronic device 101 and end when the screen sharing cancel message is received. The foregoing screen sharing cancel message may include: a screen sharing cancel message that is sent by the first electronic device 101 to the third electronic device 103 after the first electronic device 101 receives the screen sharing cancel message from the second electronic device 102, and a user operation that is detected by the third electronic device 103 and that is performed on the cancel control 412 shown in FIG. 3C or the cancel control 422 shown in FIG. 3E-1.

The third electronic device 103 may record the screen based on a preset time unit and send a recorded video stream. For example, the preset time unit is 500 milliseconds. The third electronic device 103 may send, to the first electronic device 101 every time the screen is recorded for 500 milliseconds, a video stream obtained by recording the screen within the 500 milliseconds. In this way, the third electronic device 103 may send the obtained video stream while recording the screen, so as to reduce a latency in the screen sharing process, and ensure that content displayed on the second electronic device 102 is synchronized with content displayed on the third electronic device 103 as much as possible. A length of the preset time unit is not limited in this embodiment of this application.

In other words, the first screen stream may be a video stream obtained by the third electronic device 103 from the start of screen recording to the end of screen recording. The third electronic device 103 may send the first screen stream to the first electronic device 101 in batches.

When receiving the first screen stream, the second electronic device 102 may display a user interface shown in FIG.

3E-3. The user interface shown in FIG. 3E-3 may include the third display area 302, the fourth display area 303, a projection control 305, and a "Sharing" prompt box 320. The second electronic device 102 may cancel display of the image included in the second camera video stream.

Specifically, the second electronic device 102 may display the image included in the first screen stream in the third display area 302, that is, the content displayed on the screen of the third electronic device 103. The second electronic device 102 may adaptively adjust a size of the image included in the first screen stream based on the size of the area that can be used for display on the screen of the second electronic device 102, so as to adaptively display the image included in the first screen stream. Alternatively, the second electronic device 102 may proportionally scale the size of the image included in the first screen stream based on the size of the area that can be used for display on the screen of the second electronic device 102. A method in which the second electronic device 102 displays the image included in the first screen stream is not limited in this embodiment of this application.

The second electronic device 102 may display, in the fourth display area 303, the image (for example, the image including the face of the first user) included in the first camera video stream collected by the camera of the first electronic device 101.

Same as the embodiment shown in FIG. 3A, content displayed in the third display area 302 and content displayed in the fourth display area 303 may be interchanged. For a specific implementation, refer to the foregoing embodiments. Details are not described herein again.

The projection control 305 may be used by the second electronic device 102 to search for a nearby electronic device. In this way, the second electronic device 102 may send the image included in the first screen stream to the electronic device near the second electronic device 102 for display. In response to a user operation performed on the projection control 305, the second electronic device 102 may search for the nearby electronic device, for example, an electronic device that is in a same local area network as the second electronic device 102. The second electronic device 102 may further display a user interface shown in FIG. 3F. The user interface shown in FIG. 3F may be configured to display an option of the nearby electronic device found by the second electronic device 102.

For a method in which the second electronic device 102 searches for an electronic device near the second electronic device 102, refer to the implementation in which the first electronic device 101 searches for an electronic device near the first electronic device 101 in the foregoing embodiment. Details are not described herein again.

It should be noted that, as shown in FIG. 3D, in response to a user operation performed on the "OK" button 311, the second electronic device may receive the first screen stream, and display a user interface shown in FIG. 3E-3. The device discovery control 301 on the call interface 340 may be switched to the projection control 305 shown in FIG. 3E-3.

The "Sharing" prompt box 320 may include a prompt message "Watch Mike's screen" and a screen sharing time length, for example, 10 seconds. The "Sharing" prompt box 320 may further include a cancel control 321. The cancel control 321 may be configured to cancel screen sharing. In response to a user operation performed on the cancel control 321, the second electronic device 102 may display the call interface 340 shown in FIG. 3A, and send a screen sharing cancel indication message to the first electronic device 101. Further, the first electronic device 101 may send the screen sharing cancel indication message to the third electronic device 103. When receiving the screen sharing cancel indication message, the third electronic device 103 may stop recording the screen.

In a possible implementation, when receiving the first screen stream, the second electronic device 102 may display the image included in the first screen stream, the image included in the first camera video stream, and the image included in the second camera video stream on the user interface. Specifically, the user interface shown in FIG. 3E-3 may include three display areas. The three display areas may be respectively used to display the image included in the first screen stream, the image included in the first camera video stream, and the image included in the second camera video stream.

3. The Second Electronic Device 102 May Switch the Received Shared Screen to the Fourth Electronic Device 104 for Display.

In response to a user operation performed on the projection control 305 shown in FIG. 3E-3, the second electronic device 102 may search for an electronic device near the second electronic device 102, and display a user interface shown in FIG. 3F. The user interface shown in FIG. 3F may include a device option box 330. The device option box 330 may be used to display one or more electronic devices found by the second electronic device 102. The one or more found electronic devices may be configured to perform display. The device option box 330 may further include a "Search for more devices" control 334. The "Search for more devices" control 334 may be used by the second electronic device 102 to continue to search for an electronic device near the second electronic device 102.

For example, electronic devices that are in a same local area network as the second electronic device 102 include John's tablet, John's television, and John's notebook computer. In response to the user operation performed on the projection control 305, the second electronic device 102 may find John's tablet, John's television, and John's notebook computer. In this case, the second electronic device 102 may display a "John's tablet" option 331, a "John's television" option 332, and a "John's notebook computer" option 333 in the device option box 330.

In response to a user operation performed on the "John's television" option 332, for example, a touch operation, the second electronic device 102 may send the first screen stream to the fourth electronic device 104 (that is, John's television).

When receiving the first screen stream, the fourth electronic device 104 may display a user interface 510 shown in FIG. 3F. Content displayed on the user interface 510 may be the image included in the first screen stream. In other words, the screen shared by the third electronic device 103 may be displayed by the fourth electronic device 104.

The fourth electronic device 104 may adaptively adjust the size of the image included in the first screen stream based on a size of an area that can be used for display on a screen of the fourth electronic device 104, so as to adaptively display the image included in the first screen stream. Alternatively, the fourth electronic device 104 may proportionally scale the size of the image included in the first screen stream based on the size of the area that can be used for display on the screen of the fourth electronic device 104. A method in which the fourth electronic device 104 displays the image included in the first screen stream is not limited in this embodiment of this application.

In addition, in response to a user operation performed on the "John's television" option 332, the second electronic device 102 may alternatively display the call interface 340 shown in FIG. 3B. In other words, the second electronic device 102 does not display the screen shared by the third electronic device 103. In this way, the second user may perform video communication with the first user by using the second electronic device 102, and view, by using the fourth electronic device 104, the screen shared by the first user. In a scenario in which the screen of the second electronic device 102 is relatively small and it is inconvenient for the user to view a screen shared by a video communication peer end, the user may switch the screen shared by the video communication peer end to another electronic device with a larger screen for display, for example, a tablet, a television, or a notebook computer. This better meets a user requirement for screen sharing during video communication.

Optionally, in response to a user operation performed on the "John's television" option 332, the second electronic device 102 may also display the user interface shown in FIG. 3E-1 to FIG. 3E-3. In other words, both the second electronic device 102 and the fourth electronic device 104 can display the screen shared by the third electronic device 103.

In some embodiments, the fourth electronic device 104 may cancel display of the screen shared by the third electronic device 103. Specifically, when the fourth electronic device 104 cancels display of the screen shared by the third electronic device 103, the second electronic device 102 may display the image included in the first screen stream. For a user interface displayed by the second electronic device 102, refer to the user interface shown in FIG. 3E-1 to FIG. 3E-3. In addition, the second electronic device 102 may stop sending the first screen stream to the fourth electronic device 104.

In a possible implementation, after the first electronic device 101 and the second electronic device 102 establish the video communication connection, the first electronic device 101 may collect a voice input of the first user to obtain first audio, and send the first audio and the first camera video stream to the second electronic device 102. During the screen sharing in the foregoing embodiment, the first electronic device 101 may further send the first screen stream to the second electronic device 102.

In response to a user operation of delivering the first screen stream to the fourth electronic device 104 for display, the second electronic device 102 may send the first audio and the first screen stream to the fourth electronic device 104. In this case, the fourth electronic device 104 may display the image included in the first screen stream, and may play the first audio by using a speaker. The second electronic device 102 may not play the first audio.

In other words, after receiving, on the second electronic device 102, the screen shared by the third electronic device 103, the second user may switch the screen shared by the third electronic device 103 to the fourth electronic device 104 for display. In addition, the second user may listen to the voice of the first user on the fourth electronic device 104.

In a possible implementation, when the third electronic device 103 performs screen sharing, a speaker of the third electronic device 103 plays second audio. For example, during the screen sharing, the third electronic device 103 plays a multimedia file including the second audio. The third electronic device 103 may record the screen to obtain the first screen stream. The third electronic device 103 may send the first screen stream and the second audio to the second electronic device 102 by using the first electronic device 101. The second electronic device 102 may display the image included in the first screen stream on the screen, and play the second audio by using a speaker.

In response to a user operation of delivering the first screen stream to the fourth electronic device 104 for sharing and display, the second electronic device 102 may send the second audio and the first screen stream to the fourth electronic device 104. In this case, the fourth electronic device 104 may display the image included in the first screen stream, and may play the second audio by using the speaker. The first audio in the foregoing embodiment may still be played by the second electronic device 102.

It can be learned from the foregoing screen sharing method that the first user and the second user may perform video communication by using the first electronic device and the second electronic device respectively. During the video communication, the first user may share the screen of the third electronic device (such as a mobile phone, a tablet, a television, or a notebook computer) near the first user with the second electronic device. The second user may view, by using the second electronic device, the screen shared by the first user. The second user may further switch the screen shared by the first user to the fourth electronic device (such as a mobile phone, a tablet, a television, or a notebook computer) near the second user for display. In this way, screen sharing between electronic devices is more flexible, shareable content is not limited to electronic devices that establish a video communication connection, and an electronic device having no video communication capability can also perform screen sharing by using an electronic device that establishes a video communication connection.

An Electronic Device and a Screen Sharing System that are Provided in Embodiments of this Application are Specifically Described Below with Reference to the Screen sharing method in the foregoing embodiment.

Figure 4A:
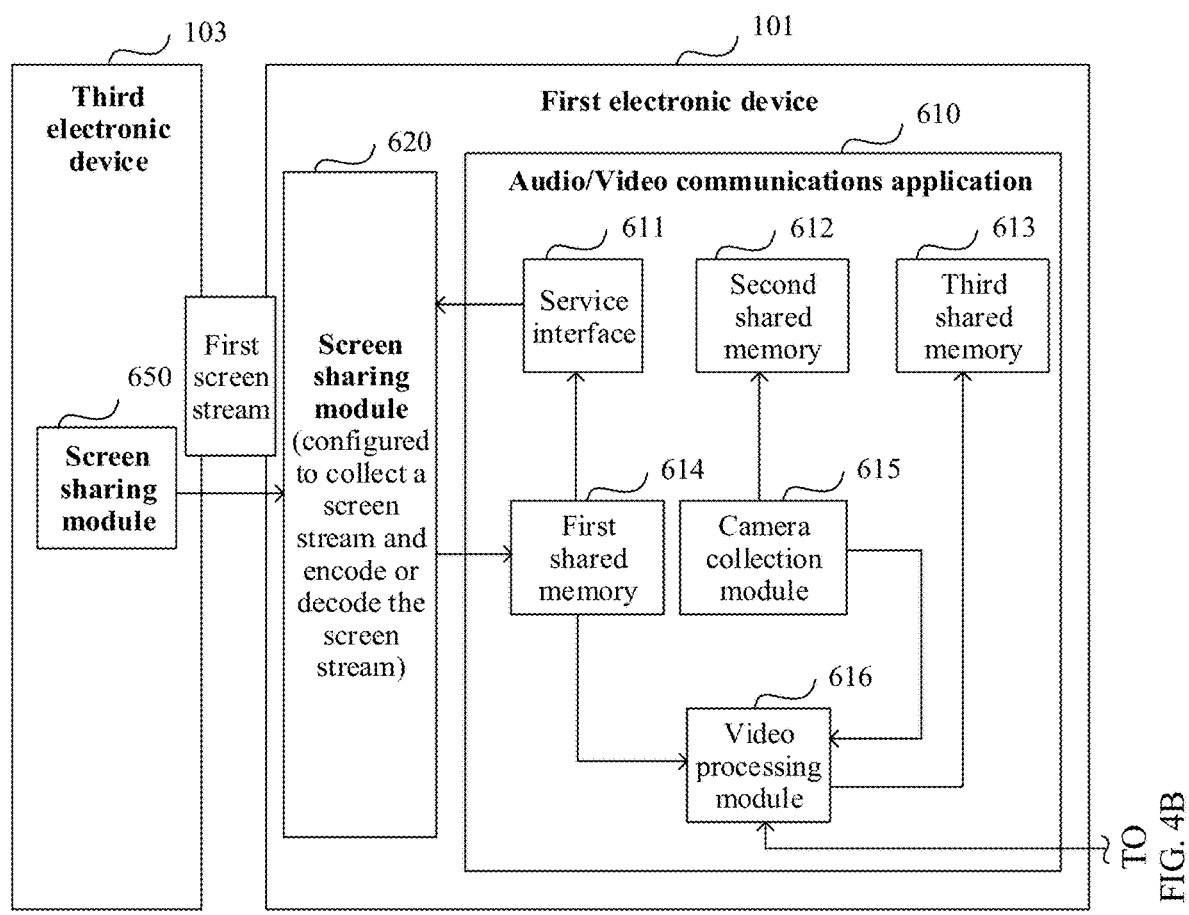
FIG. 4A and FIG. 4B are a schematic diagram of a structure of a screen sharing system according to an embodiment of this application.
Figure 4B:
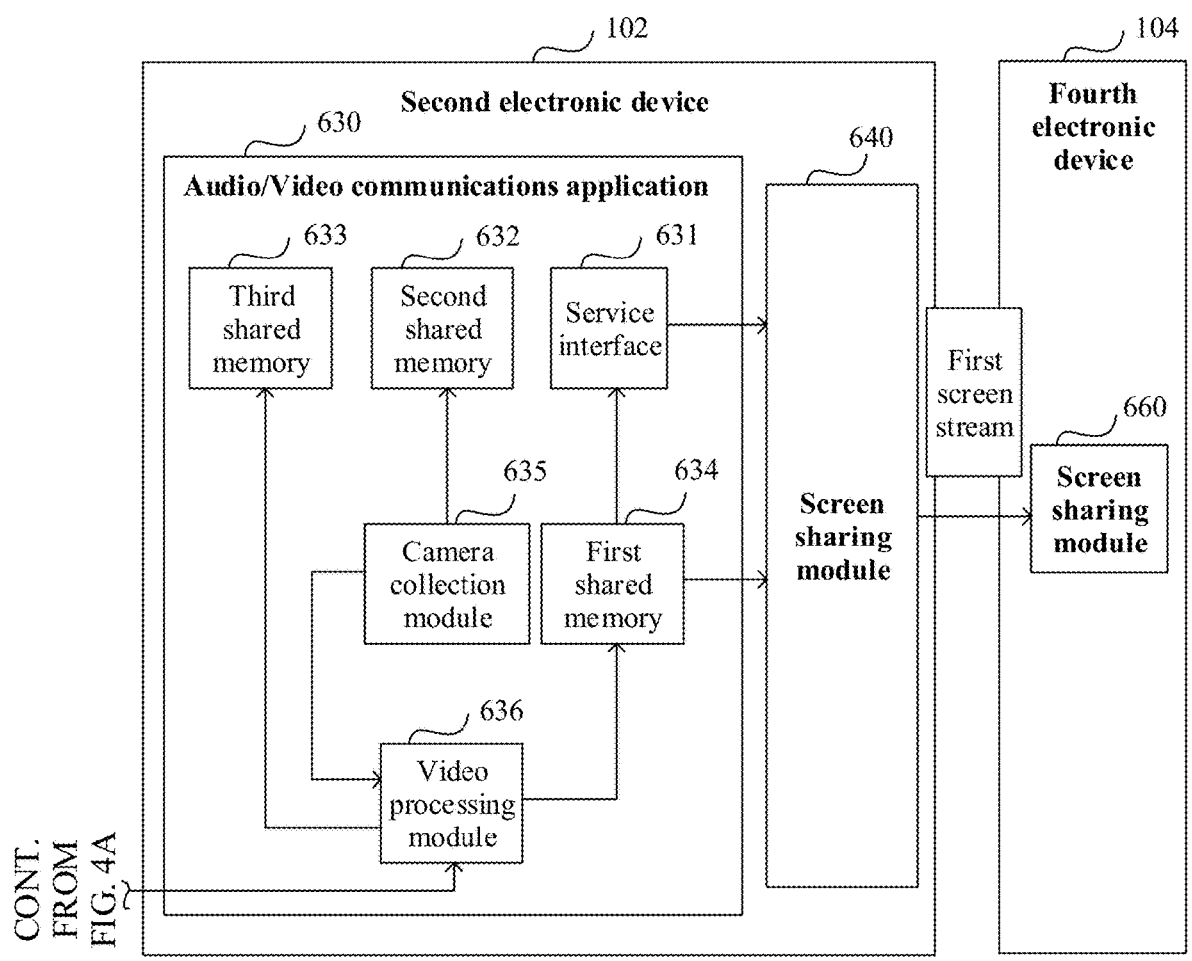

As shown in FIG. 4A and FIG. 4B, the screen sharing system may include a first electronic device 101, a second electronic device 102, a third electronic device 103, and a fourth electronic device 104. The first electronic device 101 may establish a video communication connection to the second electronic device 102. The third electronic device 103 may record a screen to obtain a first screen stream, and send the first screen stream to the second electronic device 102 by using the first electronic device 101. The second electronic device 102 may display an image included in the first screen stream. The second electronic device 102 may further send the first screen stream to the fourth electronic device 104. The fourth electronic device 104 may display the image included in the first screen stream. In other words, the second electronic device 102 and/or the fourth electronic device 104 can display content displayed on the screen of the third electronic device 103.

The first electronic device 101 may include an audio/video communications application 610 and a screen sharing module 620. The second electronic device 102 may include an audio/video communications application 630 and a screen sharing module 640. The third electronic device 103 may include a screen sharing module 650. The fourth electronic device 104 may include a screen sharing module 660.

The screen sharing module 620, the screen sharing module 640, the screen sharing module 650, and the screen sharing module 660 may be a same application or service program, and are respectively included in the first electronic device 101, the second electronic device 102, the third electronic device 103, and the fourth electronic device 104. Each of the foregoing four screen sharing modules may be configured to record a screen of the electronic device, to collect a screen stream, and encode or decode the screen stream.

The audio/video communications application 610 and the audio/video communications application 630 may be a same application (for example, a MeeTime application), and are respectively installed on the first electronic device 101 and the second electronic device 102.

The audio/video communications application 610 in the first electronic device 101 is used as an example to describe the audio/video communications application in detail.

The audio/video communications application 610 may include a service interface 611, a first shared memory 614, a second shared memory 612, a third shared memory 613, a camera collection module 615, and a video processing module 616.

The first electronic device 101 may establish an audio or video communication connection to the second electronic device 102 by using the audio/video communications application 610. When the first electronic device 101 establishes the video communication connection to the second electronic device 102, the audio/video communications application 610 may apply to a storage for storage space, to obtain the second shared memory 612 and the third shared memory 613.

The camera collection module 615 may collect a first camera video stream by using a camera (for example, a front-facing camera) of the first electronic device 101, and store the first camera video stream in the second shared memory 612. The first camera video stream may be sent to the screen of the first electronic device 101 for display. For example, as shown in FIG. 3A, the first camera video stream may be displayed in the second display area 203 on the call interface 220.

The camera collection module 615 may further send the first camera video stream to the video processing module 616.

The video processing module 616 may encode the first camera video stream in a video encoding format negotiated by the first electronic device 101 and the second electronic device 102, for example, H.264 or H.265.

The video processing module 616 may send the encoded first camera video stream to a video processing module 636 in the second electronic device 102. A transmission path of the encoded first camera video stream may be a path of the video communication connection between the first electronic device 101 and the second electronic device 102, for example, a VoIP protocol-based communication path. This is not limited in this embodiment of this application.

The video processing module 616 may further receive the encoded second camera video stream from the second electronic device 102. A camera collection module 635 in the second electronic device 102 may collect the second camera video stream by using a camera of the second electronic device 102, and send the second camera video stream to the video processing module 636. The video processing module 636 in the second electronic device 102 may encode the second camera video stream in a video encoding format negotiated by the first electronic device 101 and the second electronic device 102, for example, H.264 or H.265, and send the encoded second camera video stream to the video processing module 616. A transmission path of the encoded second camera video stream may be consistent with the transmission path of the encoded first camera video stream. When obtaining the encoded second camera video stream, the video processing module 616 performs decoding in a video encoding format negotiated by the first electronic device 101 and the second electronic device 102, to obtain the second camera video stream. Then, the video processing module 616 may store the second camera video stream in the third shared memory 613. Further, the second camera video stream may be sent to the screen of the first electronic device 101 for display. For example, as shown in FIG. 3A, the second camera video stream may be displayed in the first display area 202 on the call interface 220.

In a possible implementation, the first electronic device 101 may make marks on the second shared memory 612 and the third shared memory 613. Based on the foregoing marks, the first electronic device 101 may send data stored in the second shared memory 612 to the second display area 203 shown in FIG. 3A for display, and send data stored in the third shared memory 613 to the first display area 202 shown in FIG. 3A for display. A manner of sending the first camera video stream and the second camera video stream for display is not limited in this embodiment of this application.

In response to a user operation performed on the first electronic device 101 to share the screen of the third electronic device 103, for example, a user operation performed on the "Mike's tablet" option 211 in the device option box 210 shown in FIG. 3B, the first electronic device 101 may send a request for obtaining the first screen stream to the third electronic device 103 (that is, Mike's tablet).

The screen sharing module 620 in the first electronic device 101 may receive the encoded first screen stream from the third electronic device 103. The screen sharing module 620 may perform decoding in a video encoding format negotiated by the first electronic device 101 and the third electronic device 103.

The audio/video communications application 610 in the first electronic device 101 may apply to the storage for storage space, to obtain the first shared memory 614. The first shared memory 614 may be configured to store the first screen stream. The screen sharing module 620 may obtain an address of the first shared memory 614 through the service interface 611, and store the first screen stream in the first shared memory 614.

The service interface 611 may be configured to associate the audio/video communications application 610 with the screen sharing module 620. When the audio/video communications application 610 applies for the first shared memory 614, the service interface 611 may obtain the address of the first shared memory 614, and send the address to the screen sharing module 620.

The video processing module 616 may obtain the first screen stream from the first shared memory 614, and encode the first screen stream. The video processing module 616 may send both the encoded first screen stream and the encoded first camera video stream to the video processing module 636 in the second electronic device. For a manner in which the video processing module 616 encodes the first screen stream, refer to the method in which the video processing module 616 encodes the first camera video stream. Details are not described herein again.

In this embodiment of this application, the first shared memory 614, the second shared memory 612, and the third shared memory 613 each may be, for example, a surface in an Android application. The surface may be used to store data of different applications during interaction. Specific forms of the first shared memory 614, the second shared memory 612, and the third shared memory 613 are not limited in this embodiment of this application.

In addition, the first screen stream and the first camera video stream may be transmitted on a same channel. The video processing module 616 may add data identifiers to the first screen stream and the first camera video stream. When receiving data from the channel for transmitting the first screen stream and the first camera video stream, the video processing module 636 in the second electronic device 102 may distinguish, according to the data identifiers, whether the received data is the first screen stream or the first camera video stream. Further, the video processing module 636 may store the first screen stream in a first shared memory 634, and store the first camera video stream in a third shared memory 633. For a specific implementation of transmitting a plurality of video streams on a same channel, refer to an implementation of transmitting a plurality of video streams on a same channel in the conventional technology. This is not limited in this embodiment of this application.

The audio/video communications application 630 in the second electronic device 102 may include a service interface 631, the first shared memory 634, a second shared memory 632, the third shared memory 633, the camera collection module 635, and the video processing module 636. For functions of the parts included in the audio/video communications application 630, refer to the descriptions of the audio/video communications application 610 in the foregoing embodiment. Details are not described herein again.

It should be noted that, in response to a user operation performed on the first electronic device 101 to share the screen of the third electronic device 103, the first electronic device 101 may send a screen sharing request to the second electronic device 102. The second electronic device 102 may display the user interface shown in FIG. 3D, to query the second user of the second electronic device 102 whether to accept the screen sharing request.

In response to a user operation performed on the "OK" button 311 shown in FIG. 3D, the second electronic device 102 may apply to a storage for a memory, to obtain the first shared memory 634. In this way, the video processing module 636 may store the received first screen stream in the first shared memory 634. Alternatively, the second electronic device 102 may apply for the first shared memory 634 before detecting a user operation performed on the "OK" button 311 shown in FIG. 3D. A time at which the second electronic device applies for the first shared memory is not limited in this embodiment of this application.

The service interface 631 may associate the screen sharing module 640 with the audio/video communications application 630. The service interface 631 may obtain an address of the first shared memory 634. In response to a user operation of switching the received screen shared by the third electronic device 103 to the fourth electronic device 104 for display, for example, a user operation performed on the "John's television" option 332 in the device option box 330 shown in FIG. 3F, the service interface 631 may send the address of the first shared memory 634 to the screen sharing module 640. The screen sharing module 640 may obtain the first screen stream from the first shared memory 634 based on the address of the first shared memory 634, and encode the first screen stream. The screen sharing module 640 may encode the first screen stream in a video encoding format negotiated by the second electronic device 102 and the fourth electronic device 104. Further, the screen sharing module 640 may send the encoded first screen stream to the fourth electronic device 104.

In response to a user operation performed on the first electronic device 101 to share the screen of the third electronic device 103, the first electronic device 101 may send a request for obtaining the first screen stream to the third electronic device. When receiving the request for obtaining the first screen stream, the third electronic device 103 may record the screen by using the screen sharing module 650, to obtain the first screen stream. The screen sharing module 650 may encode the first screen stream in a video encoding format negotiated by the first electronic device 101 and the third electronic device 103, and send the encoded first screen stream to the screen sharing module 620 in the first electronic device 101.

In response to a user operation performed on the second electronic device 102 to switch the screen shared by the third electronic device 103 to the fourth electronic device 104 for display, the screen sharing module 640 in the second electronic device 102 may send the encoded first screen stream to the screen sharing module 660 in the fourth electronic device 104. When receiving the encoded first screen stream, the screen sharing module 660 may perform decoding in a video encoding format negotiated by the second electronic device 102 and the fourth electronic device 104, to obtain the first screen stream. The fourth electronic device 104 may send the first screen stream to the screen for display. In this way, the fourth electronic device 104 may display the screen shared by the third electronic device 103.

A channel for transmitting the first screen stream from the third electronic device 103 to the first electronic device 101 may be a channel for establishing a communication connection between the first electronic device 101 and the third electronic device 103, for example, a channel for establishing a communication connection based on a Wi-Fi direct protocol. A channel for transmitting the first screen stream from the second electronic device 102 to the fourth electronic device 104 may be a channel for establishing a communication connection between the second electronic device 102 and the fourth electronic device 104. A manner of communication between the first electronic device 101 and the third electronic device 103 and a manner of communication between the second electronic device 102 and the fourth electronic device 104 are not limited in this embodiment of this application.

The first electronic device 101, the second electronic device 102, the third electronic device 103, and the fourth electronic device 104 each may further include more or fewer applications and modules. This is not limited in this embodiment of this application.

In a possible implementation, after the first electronic device 101 and the second electronic device 102 establish the video communication connection, the first electronic device 101 may collect a voice input of the first user to obtain first audio. The first electronic device 101 may further include an audio processing module A and a fourth shared memory A. The fourth shared memory A may be obtained by the audio/video communications application 610 by applying to the storage. The first electronic device 101 may store the first audio in the fourth shared memory A. The audio processing module A in the first electronic device 101 may obtain the first audio from the fourth shared memory A, and encode the first audio in an audio encoding format negotiated by the first electronic device 101 and the second electronic device 102. The audio processing module A may send the encoded first audio to the second electronic device 102.

The second electronic device 102 further includes an audio processing module B and a fourth shared memory B. When receiving the encoded first audio, the audio processing module B may perform decoding to obtain the first audio, and store the first audio in the fourth shared memory B. The first audio may be sent to a speaker of the second electronic device 102 for play. During the screen sharing in the foregoing embodiment, the video processing module 616 in the first electronic device 101 may further send the first screen stream to the video processing module 636 in the second electronic device 102.

The screen sharing module 640 in the second electronic device 102 may obtain addresses of the first shared memory 634 and the fourth shared memory B through the service interface 631. In response to a user operation of delivering the first screen stream to the fourth electronic device 104 for display, the screen sharing module 640 may obtain the first screen stream from the first shared memory 634, obtain the first audio from the fourth shared memory B, and send the first screen stream and the first audio to the fourth electronic device 104. When receiving the first screen stream and the first audio, the fourth electronic device 104 may display an image included in the screen stream, and may play the first audio by using a speaker. The second electronic device 102 may not play the first audio.

In a possible implementation, when the third electronic device 103 performs screen sharing, a speaker of the third electronic device 103 plays second audio. For example, during the screen sharing, the third electronic device 103 plays a multimedia file including the second audio. In response to a user operation performed on the first electronic device 101 to share the screen of the third electronic device 103, the third electronic device 103 may send the second audio and the first screen stream obtained by recording the screen to the first electronic device 101.

It should be noted that the third electronic device 103 may include a multimedia file processing module. The multimedia file processing module may send the second audio to the speaker of the third electronic device 103 for play, and send the second audio to the screen sharing module 650 in the third electronic device 103. A manner in which the third electronic device 103 obtains the second audio from the multimedia file including the second audio is not limited in this embodiment of this application.

The first electronic device 101 may include an audio processing module A and a fourth shared memory C. The fourth shared memory C may be obtained by the audio/video communications application 610 by applying to the storage. The first electronic device 101 may store the second audio in the fourth shared memory C.

During the screen sharing in the foregoing embodiment, the audio processing module A in the first electronic device 101 may obtain the second audio from the fourth shared memory C, and encode the second audio in an audio encoding format negotiated by the first electronic device 101 and the second electronic device 102. The audio processing module A may send the encoded second audio to the second electronic device 102. The video processing module 616 in the first electronic device 101 may further send the first screen stream to the video processing module 636 in the second electronic device 102.

The second electronic device 102 may include an audio processing module B and a fourth shared memory D. When receiving the encoded second audio, the audio processing module B may perform decoding to obtain the second audio. Further, the audio processing module B may store the second audio in the fourth shared memory D. The second audio may be sent to the speaker of the second electronic device 102 for play. The second electronic device 102 may further display an image included in the first screen stream. For an implementation in which the second electronic device 102 simultaneously plays the first audio and the second audio, refer to an implementation in which an electronic device simultaneously plays two channels of audio in the conventional technology. Details are not described herein.

In response to a user operation performed on the second electronic device 102 to switch the screen shared by the third electronic device 103 to the fourth electronic device 104 for display, the second electronic device 102 may send the second audio and the first screen stream to the fourth electronic device 104. In this way, the fourth electronic device 104 may play the second audio, and display the image included in the first screen stream. The second electronic device 102 may not play the second audio.

For an implementation for transmitting the first audio or the second audio from the first electronic device 101 to the second electronic device 102 and from the second electronic device 102 to the fourth electronic device 104, refer to an implementation of audio transmission in a video communication process in the conventional technology. This is not limited in this embodiment of this application.

In the screen sharing system shown in FIG. 4A and FIG. 4B, when the first electronic device 101 and the second electronic device 102 establish the video communication connection, the third electronic device 103 may share the screen with the second electronic device 102 by using the first electronic device 101. The second electronic device 102 may display content displayed on the screen of the third electronic device 103, or may send content displayed on the screen of the third electronic device 103 to the fourth electronic device 104 for display. The third electronic device 103 may be an electronic device near the first electronic device 101. The fourth electronic device 104 may be an electronic device near the second electronic device. In this way, screen sharing between electronic devices is more flexible, shareable content is not limited to electronic devices that establish a video communication connection, and an electronic device having no video communication capability can also perform screen sharing by using an electronic device that establishes a video communication connection.

FIG. 5A and FIG. 5B and FIG. 6A and FIG. 6B Each Show an Example of a Specific Process of Information Exchange when an Electronic Device Shares a Screen in a Video Communication Process According to an Embodiment of this Application.

Figure 5A:
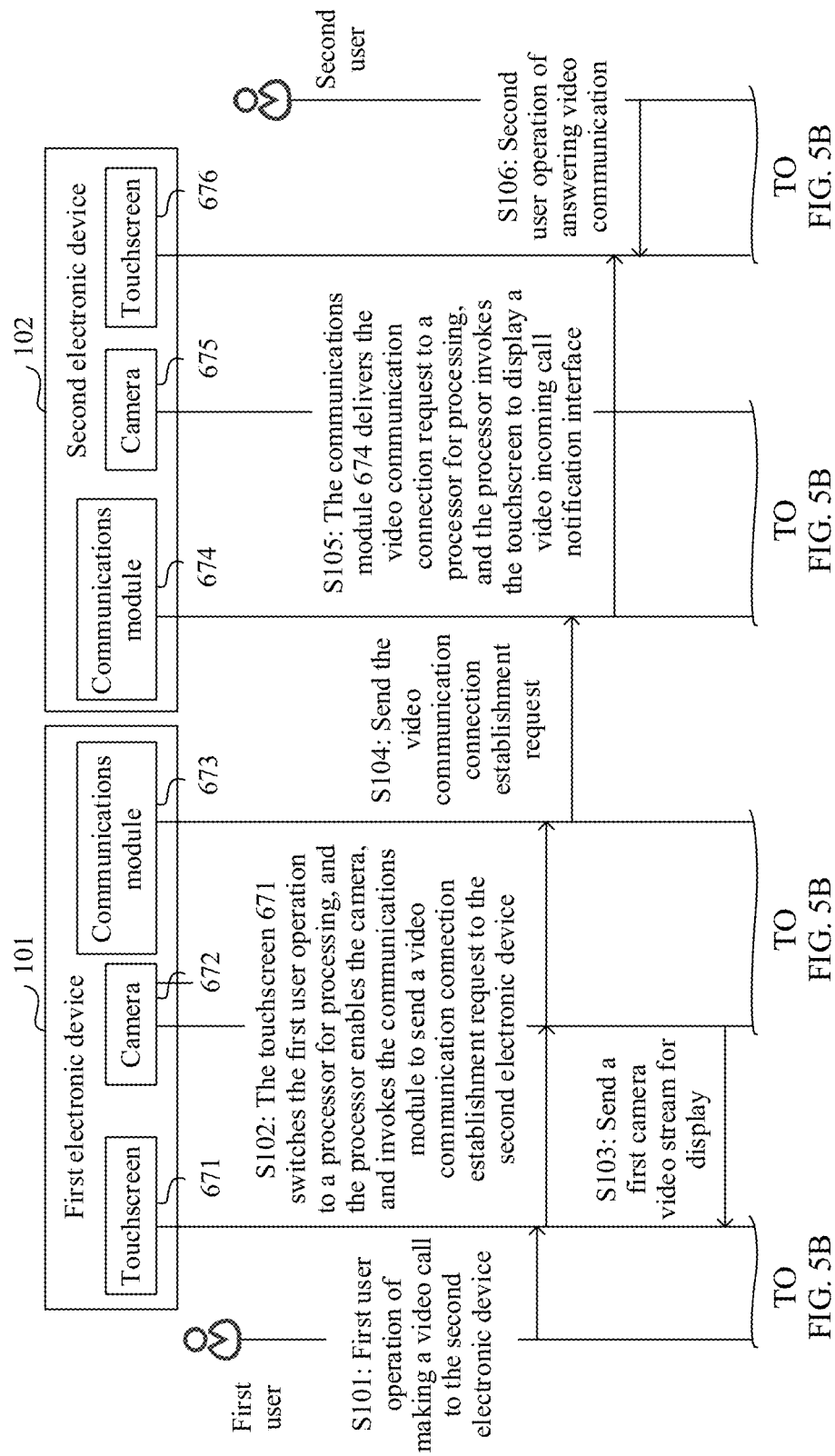
FIG. 5A and FIG. 5B are a flowchart of a method for establishing video communication by an electronic device according to an embodiment of this application.
Figure 5B:
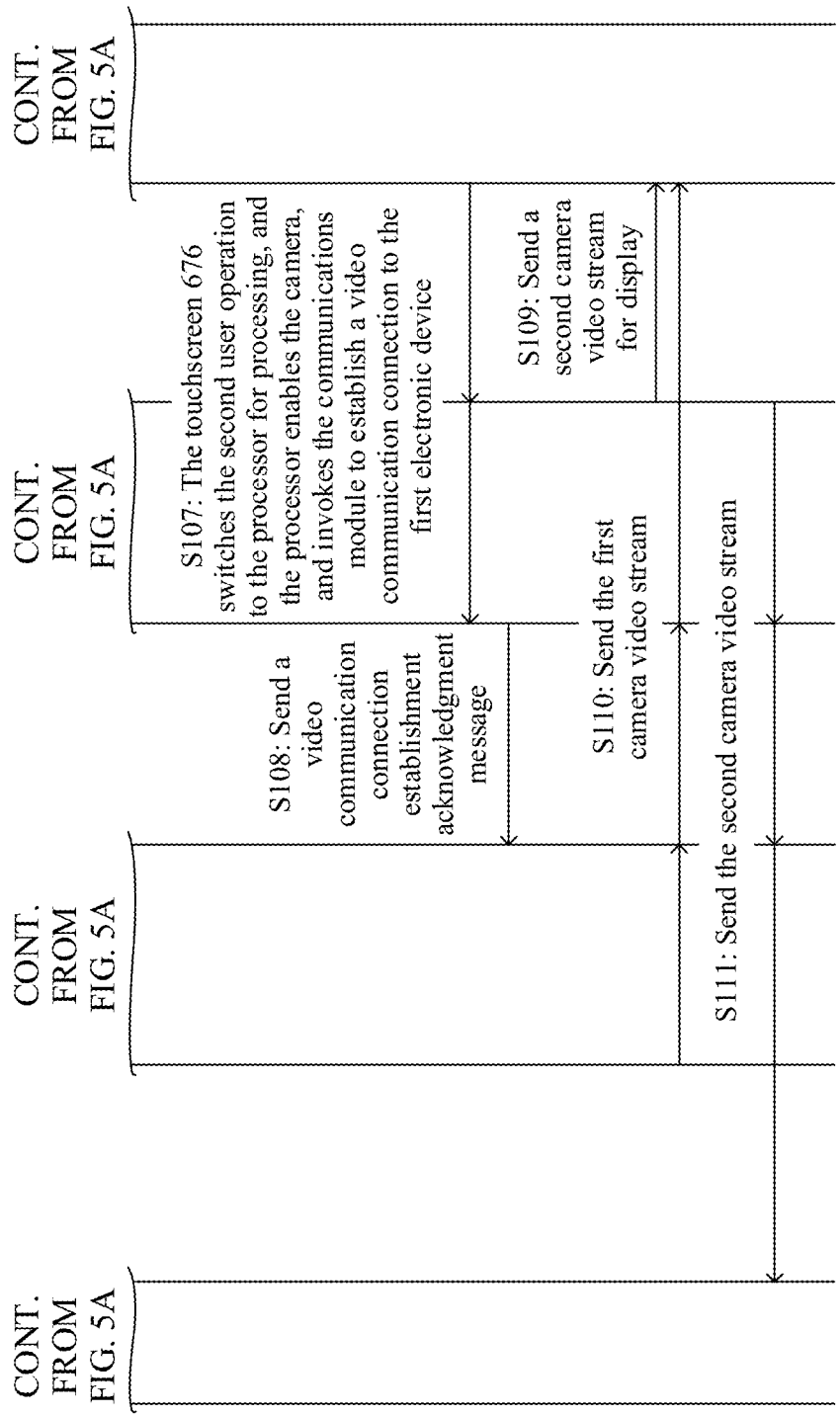
Figure 6B:
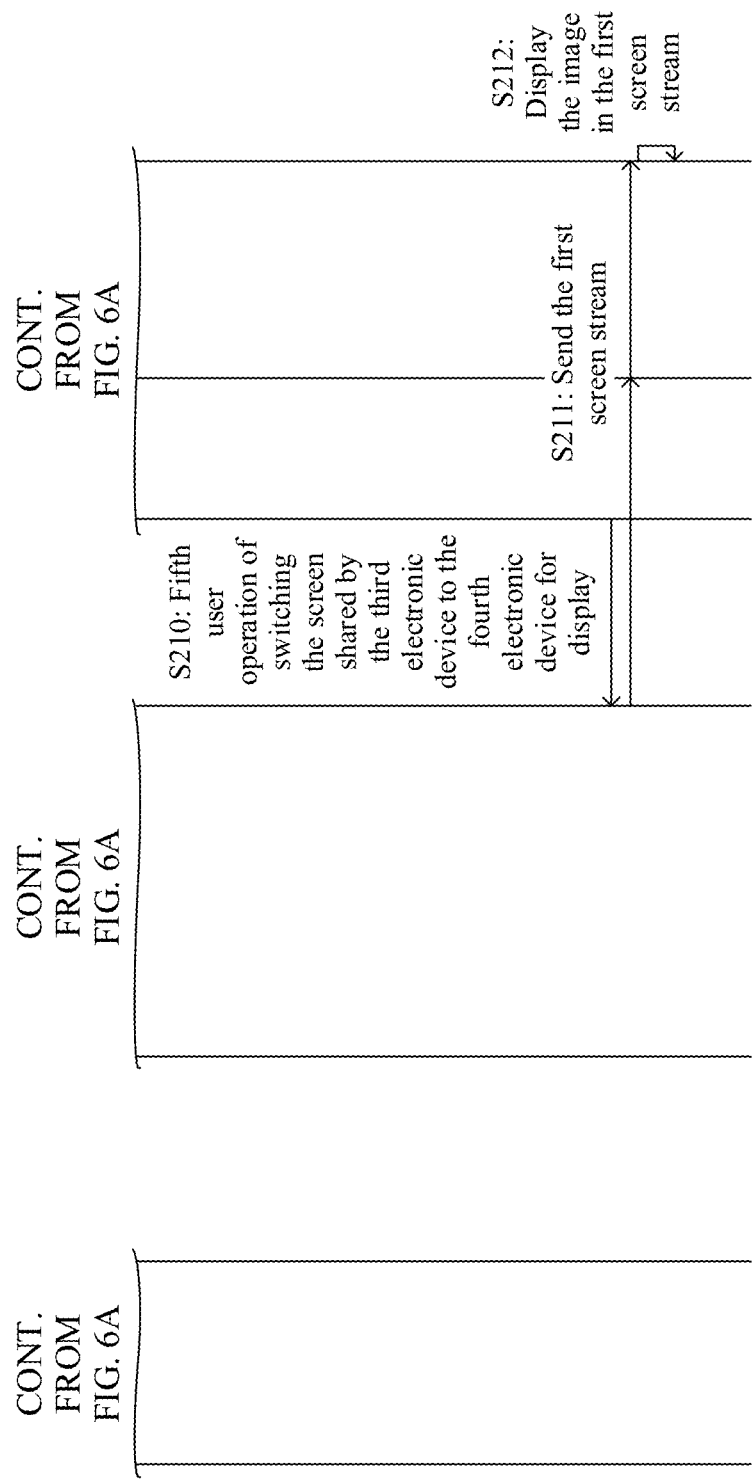

FIG. 5A and FIG. 5B show a specific process of exchanging information when a first electronic device 101 establishes a video communication connection to a second electronic device 102 according to an embodiment of this application. FIG. 6A and FIG. 6B show a specific process of exchanging information when a third electronic device 103 shares a screen according to an embodiment of this application.

1. The First Electronic Device 101 May Establish a Video Communication Connection to the Second Electronic Device 102.

As shown in FIG. 5A and FIG. 5B, that the first electronic device 101 establishes a video communication connection to the second electronic device 102 may include steps S101 to S111.

S101: A touchscreen 671 of the first electronic device 101 may detect a first user operation of making a video call to the second electronic device 102.

The first user operation may include: enabling an audio/video call application (such as a MeeTime application) on the first electronic device 101, and performing dialing on a contact manner (such as a phone number) associated with the second electronic device 102. The foregoing first user operation is not limited in this embodiment of this application.

S102: The touchscreen 671 may switch the first user operation to a processor of the first electronic device 101 for processing, and the processor may enable a camera 672, and invoke a communications module 673 to send a video communication connection establishment request to the second electronic device 102.

S103: The first electronic device 101 may send a first camera video stream to the touchscreen 671 for display.

The first camera video stream may be collected by the camera 672 of the first electronic device 101. For a specific implementation in which the first electronic device 101 displays an image included in the first camera video stream, refer to the embodiment shown in FIG. 4A and FIG. 4B. Details are not described herein again. The image in the first camera video stream may be displayed in the second display area 203 shown in FIG. 3A.

S104: The first electronic device 101 may send the video connection request to a communications module 674 in the second electronic device 102 by using the communications module 673.

A time sequence of performing step S103 and step S104 is not limited in this embodiment of this application.

S105: When receiving the video connection establishment request, the communications module 674 may deliver the communication connection request to a processor of the second electronic device 102 for processing. The processor may invoke a touchscreen 676 to display a video incoming call notification interface.

S106: The touchscreen 676 of the second electronic device 102 may detect a second user operation of answering video communication.

The video incoming call notification interface may include an answer control for answering video communication. The second user operation may be, for example, a touch operation performed on the answer control. The foregoing second user operation is not limited in this embodiment of this application.

S107: The touchscreen 676 may switch the second user operation to the processor of the second electronic device 102 for processing, and the processor may enable a camera 675 of the second electronic device 102, and invoke the communications module 674 to establish the video communication connection to the first electronic device 101.

S108: The second electronic device 102 may send a video communication connection establishment acknowledgment message to the communications module 673 in the first electronic device 101 by using the communications module 674.

S109: The second electronic device 102 may send a second camera video stream to the touchscreen 676 of the second electronic device 102 for display.

The second camera video stream may be collected by the camera 675. For a specific implementation in which the second electronic device 102 displays an image included in the second camera video stream, refer to the embodiment shown in FIG. 4A and FIG. 4B. Details are not described herein again. The image in the second camera video stream may be displayed in the fourth display area 303 shown in FIG. 3A.

A time sequence of performing step S108 and step S109 is not limited in this embodiment of this application.

S110: When receiving the video communication connection establishment acknowledgment message, the communications module 673 may switch the video communication connection establishment acknowledgment message to the processor of the first electronic device 101 for processing.

The processor may send the first camera video stream to the second electronic device 102 by using the communications module 673.

When receiving the first camera video stream, the second electronic device 102 may send the first camera video stream to the touchscreen 676 of the second electronic device 102 for display. For a specific implementation in which the second electronic device 102 displays an image included in the first camera video stream, refer to the embodiment shown in FIG. 4A and FIG. 4B. Details are not described herein again. The image in the first camera video stream may be displayed in the third display area 302 shown in FIG. 3A.

S111: When the second electronic device 102 establishes the video communication connection to the first electronic device 101, the second electronic device 102 may send the second camera video stream to the communications module 673 of the first electronic device 101 by using the communications module 674.

When receiving the second camera video stream, the first electronic device 101 may send the second camera video stream to the touchscreen 671 of the first electronic device 101 for display. For a specific implementation in which the first electronic device 101 displays an image included in the second camera video stream, refer to the embodiment shown in FIG. 4A and FIG. 4B. Details are not described herein again. The image in the second camera video stream may be displayed in the first display area 202 shown in FIG. 3A.

A time sequence of performing step S110 and step S111 is not limited in this embodiment of this application.

In a possible implementation, a data transmission channel used when the first electronic device 101 and the second electronic device 102 perform video communication may work in a full-duplex working manner. In other words, the first electronic device 101 and the second electronic device 102 may respectively transmit the first camera video stream and the second camera video stream on one channel.

It should be noted that, before sending the first camera video stream to the second electronic device 102, the first electronic device 101 may encode the first camera video stream in a video encoding format negotiated by the first electronic device 101 and the second electronic device 102. The second electronic device 102 may receive the encoded first camera video stream. The second electronic device may decode the encoded first camera video stream in a video encoding format negotiated by the first electronic device 101 and the second electronic device 102. Then, the second electronic device 102 may send the first camera video stream to the touchscreen 676 for display. For a process in which the second electronic device 102 sends the second camera video stream and the first electronic device 101 sends the second camera video stream to the touchscreen 671 for display, refer to the foregoing embodiment. Details are not described herein again.

A specific manner of establishing the video communication connection between the first electronic device 101 and the second electronic device 102 is not limited in this embodiment of this application. In addition to the implementation shown in FIG. 4A and FIG. 4B, the first electronic device 101 and the second electronic device 102 may alternatively perform video communication in another video communication connection establishment manner in the conventional technology.

After the first electronic device 101 and the second electronic device 102 establish the video communication connection, both a first user (a user who uses the first electronic device 101) and a second user (a user who uses the second electronic device 102) can view an image collected by the first electronic device 101 by using the camera and an image collected by the second electronic device 102 by using the camera. This implements video communication.

2. The Third Electronic Device 103 May Share the Screen.

As shown in FIG. 6A and FIG. 6B, that the third electronic device 103 shares the screen may include steps S201 to S212.

The first electronic device 101 and the second electronic device 102 have established the video communication connection.

S201: The first electronic device 101 may detect a third user operation of sharing the screen of the third electronic device 103.

The third user operation may include a user operation performed on the device discovery control 201 shown in FIG. 3A and a user operation performed on the "Mike's tablet" option 211 shown in FIG. 3B. Mike's tablet may represent the third electronic device. Not limited to the tablet, the third electronic device may alternatively be another type of electronic device, for example, a television or a notebook computer. The foregoing third user operation is not limited in this embodiment of this application.

S202: In response to the third user operation, the first electronic device 101 may send a request for obtaining a first screen stream to the third electronic device 103.

S203: The third electronic device 103 may invoke a screen sharing module to record the screen of the third electronic device 103 to obtain the first screen stream.

For an implementation in which the third electronic device 103 records the screen, refer to the embodiment shown in FIG. 4A and FIG. 4B. Details are not described herein again.

S204: The third electronic device 103 may send the first screen stream to the first electronic device 101.

The third electronic device 103 may first encode the first screen stream in a video encoding format negotiated by the first electronic device 101 and the third electronic device 103, and then send the encoded first screen stream to the first electronic device 101.

When receiving the encoded first screen stream, the first electronic device 101 may first perform decoding to obtain the first screen stream. The first electronic device 101 may store the first screen stream in the first shared memory 614 shown in FIG. 4A and FIG. 4B. The first electronic device 101 may not display an image included in the first screen stream. If the first electronic device 101 receives a screen sharing accept acknowledgment message from the second electronic device 102, the first electronic device 101 may send the first screen stream to the second electronic device 102. For a specific process in which the first electronic device 101 stores the first screen stream, refer to the embodiment shown in FIG. 4A and FIG. 4B. Details are not described herein again.

S205: In response to the third user operation, the first electronic device 101 may further send a screen sharing request to the second electronic device 102.

A time sequence of performing step S205 and step S202 is not limited in this embodiment of this application.

S206: The second electronic device 102 may detect a fourth user operation of accepting screen sharing.

When receiving the screen sharing request, the second electronic device 102 may display the user interface shown in FIG. 3D. In this case, the fourth user operation may be a touch operation performed on the "OK" button 311 shown in FIG. 3D.

The foregoing fourth user operation is not limited in this embodiment of this application.

S207: The second electronic device 102 may send the screen sharing accept message to the first electronic device 101.

S208: When determining that the second electronic device accepts screen sharing, the first electronic device 101 may send the first screen stream of the third electronic device 103 to the second electronic device.

The first electronic device 101 may first encode the first screen stream in a video encoding format negotiated by the first electronic device 101 and the second electronic device 102, and then send the encoded first screen stream to the second electronic device 102.

In some embodiments, the first electronic device 101 may adjust the first screen stream based on network quality of the first electronic device 101 and/or a congestion status of a channel for performing video communication between the first electronic device 101 and the second electronic device 102, for example, may compress a resolution of the first screen stream or convert a format of the first screen stream. Then, the first electronic device 101 may send the adjusted first screen stream to the second electronic device 102. A module that adjusts the first screen stream may be the video processing module 616 in the first electronic device 101 in the embodiment in FIG. 4A and FIG. 4B. For example, the resolution of the first screen stream received by the first electronic device 101 from the third electronic device 103 is 1080p. Because the network quality of the first electronic device 101 is poor, the first electronic device 101 may compress the resolution of the first screen stream to 720p. Then, the first electronic device 101 may send the first screen stream whose resolution is 720p to the second electronic device.

A manner in which the first electronic device 101 adjusts the first screen stream is not limited in this embodiment of this application.

S209: The second electronic device 102 may display an image in the first screen stream.

For an implementation in which the second electronic device 102 sends the first screen stream to the touchscreen for display, refer to the embodiment shown in FIG. 4A and FIG. 4B. Details are not described herein again.

S210: The second electronic device 102 detects a fifth user operation of switching the screen shared by the third electronic device to a fourth electronic device for display.

The fifth user operation may include a touch operation performed on the projection control 305 shown in FIG. 3E-3 and a touch operation performed on the "John's television" option 332 shown in FIG. 3F. John's television may represent the fourth electronic device 104. Not limited to the television, the fourth electronic device 104 may alternatively be another type of electronic device, for example, a tablet or a notebook computer. The foregoing fifth user operation is not limited in this embodiment of this application.

S211: The second electronic device 102 may send the first screen stream to a communications module 679 in the fourth electronic device 104.

After sending the first screen stream to the fourth electronic device 104, the second electronic device 102 may display the image included in the first camera video stream and the image included in the second camera video stream on the touchscreen. For details, refer to FIG. 3B.

Alternatively, after sending the first screen stream to the fourth electronic device 104, the second electronic device 102 may still display the image included in the first camera video stream and the image included in the first screen stream on the touchscreen. For details, refer to FIG. 3E-1 to FIG. 3E-3.

In some embodiments, the second electronic device 102 may adjust the received first screen stream based on network quality of the second electronic device 102 and/or a congestion status of a channel for performing short-distance communication between the second electronic device 102 and the fourth electronic device 104, and then send the adjusted first screen stream to the fourth electronic device 104. A module that adjusts the first screen stream may be the video processing module 636 in the second electronic device 102 in the embodiment in FIG. 4A and FIG. 4B. For a manner in which the second electronic device 102 adjusts the received first screen stream, refer to the manner in which the first electronic device 101 adjusts the first screen stream in the foregoing embodiment. Details are not described herein again.

S212: When receiving the first screen stream, a display module 680 in the fourth electronic device 104 may display the image in the first screen stream.

For an implementation in which the second electronic device 102 sends the first screen stream and the fourth electronic device 104 displays the image in the first screen stream, refer to the embodiment shown in FIG. 4A and FIG. 4B. Details are not described herein again.

The Second Electronic Device 102 May Send the First Screen Stream and the First Camera Video Stream to the Fourth Electronic Device 104.

In some embodiments, when the second electronic device 102 switches the screen shared by the third electronic device 103 to the fourth electronic device for display, the second electronic device 102 may send both the first screen stream and the first camera video stream to the fourth electronic device 104. The fourth electronic device 104 may display the image included in the first screen stream and the image included in the first camera video stream.

As shown in FIG. 3F, in response to a user operation performed on the "John's television" option 332, the second electronic device 102 may send the first screen stream and the first camera video stream to the fourth electronic device 104.

Figure 7:
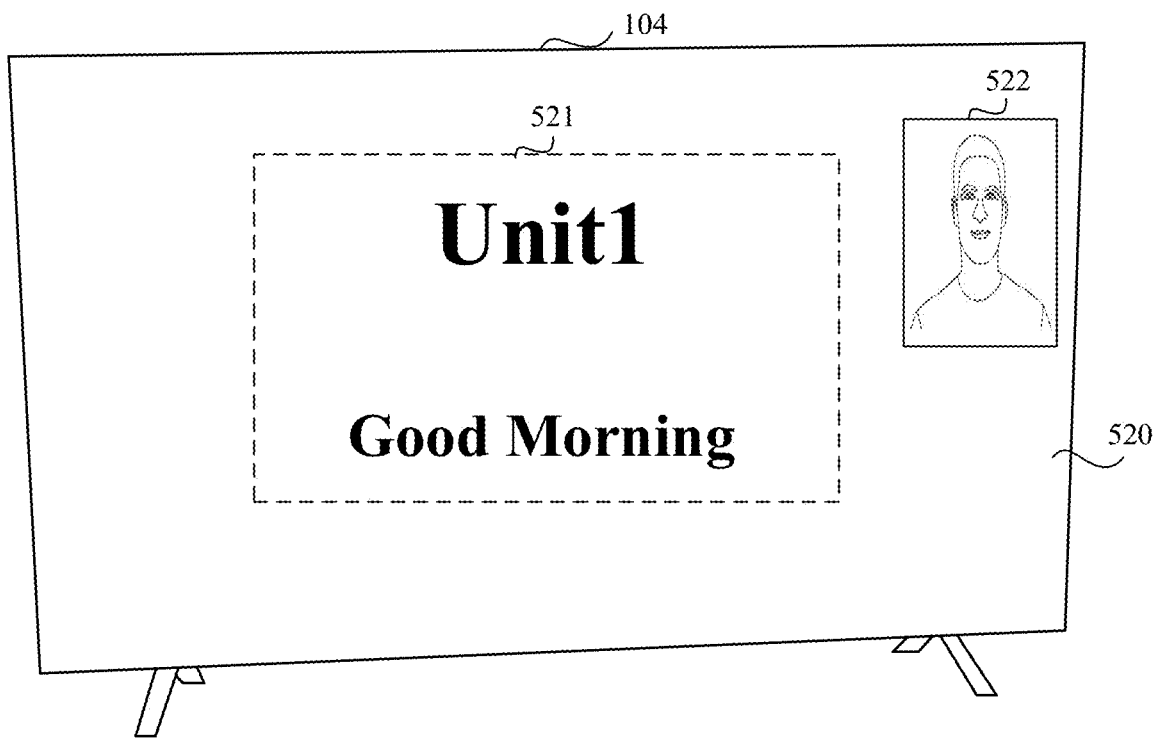
FIG. 7 is a schematic diagram of a user interface of an electronic device during screen sharing according to an embodiment of this application.

When receiving the first screen stream and the first camera video stream, the fourth electronic device 104 may display a user interface 520 shown in FIG. 7. The user interface 520 may include a display area 521 and a display area 522. The display area 521 may be used to display the image included in the first screen stream, and the display area 522 may be used to display the image included in the first camera video stream. Optionally, content displayed in the display area 521 and content displayed in the display area 522 may be interchanged. For example, in response to a touch operation performed on the display area 522, the fourth electronic device 104 may interchange the content displayed in the display area 521 and the content displayed in the display area 522. In other words, the display area 521 may be used to display the image included in the first camera video stream, and the display area 522 may be used to display the image included in the first screen stream.

In a possible implementation, the fourth electronic device 104 may apply to a storage for two shared memories, for example, a fifth shared memory and a sixth shared memory. When receiving the first screen stream and the first camera video stream, the fourth electronic device 104 may respectively store the first screen stream and the first camera video stream in the fifth shared memory and the sixth shared memory. Further, the fourth electronic device 104 may send data in the fifth shared memory to the display area 521 for display, and send data in the sixth shared memory to the display area 522 for display.

The fourth electronic device 104 may alternatively display the first screen stream and the first camera video stream on a screen in another manner. This is not limited in this embodiment of this application.

Locations and sizes of the display area 521 and the display area 522 are not limited in this embodiment of this application.

In a possible implementation, in response to a user operation of delivering the first screen stream to the fourth electronic device 104 for display, the second electronic device 102 may send the first screen stream, the first camera video stream, and first audio to the fourth electronic device 104. In this case, the fourth electronic device 104 may display the image included in the first screen stream and the image included in the first camera video stream. For details, refer to FIG. 7. The fourth electronic device 104 may further play the first audio by using a speaker. The second electronic device 102 may not play the first audio.

For an implementation in which the second electronic device 102 receives the first audio, refer to the foregoing embodiment. Details are not described herein again.

After sending the first screen stream and the first camera video stream, the second electronic device 102 may display the image included in the first camera video stream and the image included in the second camera video stream on the screen. For details, refer to FIG. 3A. Alternatively, after sending the first screen stream and the first camera video stream, the second electronic device 102 may display the image in the first screen stream and the image included in the first camera video stream on the screen.

In this embodiment of this application, the first electronic device 101, the second electronic device 102, the third electronic device 103, and the fourth electronic device 104 each may be an electronic device having a video communication function, for example, a mobile phone, a tablet, or a notebook computer. In addition, the third electronic device 103 and the fourth electronic device 104 each may alternatively be an electronic device having no video communication function. Optionally, the fourth electronic device 104 may alternatively be an electronic device having only a display function, for example, a projector or an electronic whiteboard.

The Electronic Device 102 May Send a Second Screen Stream to the Fourth Electronic device 104.

The second screen stream may be a video stream obtained by the second electronic device 102 by recording the screen of the second electronic device 102. The fourth electronic device 104 may display content displayed on the second electronic device 102.

As shown in FIG. 3F, in response to a user operation performed on the "John's television" option 332, the second electronic device 102 may record the screen to obtain the second screen stream, and send the second screen stream to the fourth electronic device 104.

Figure 8:
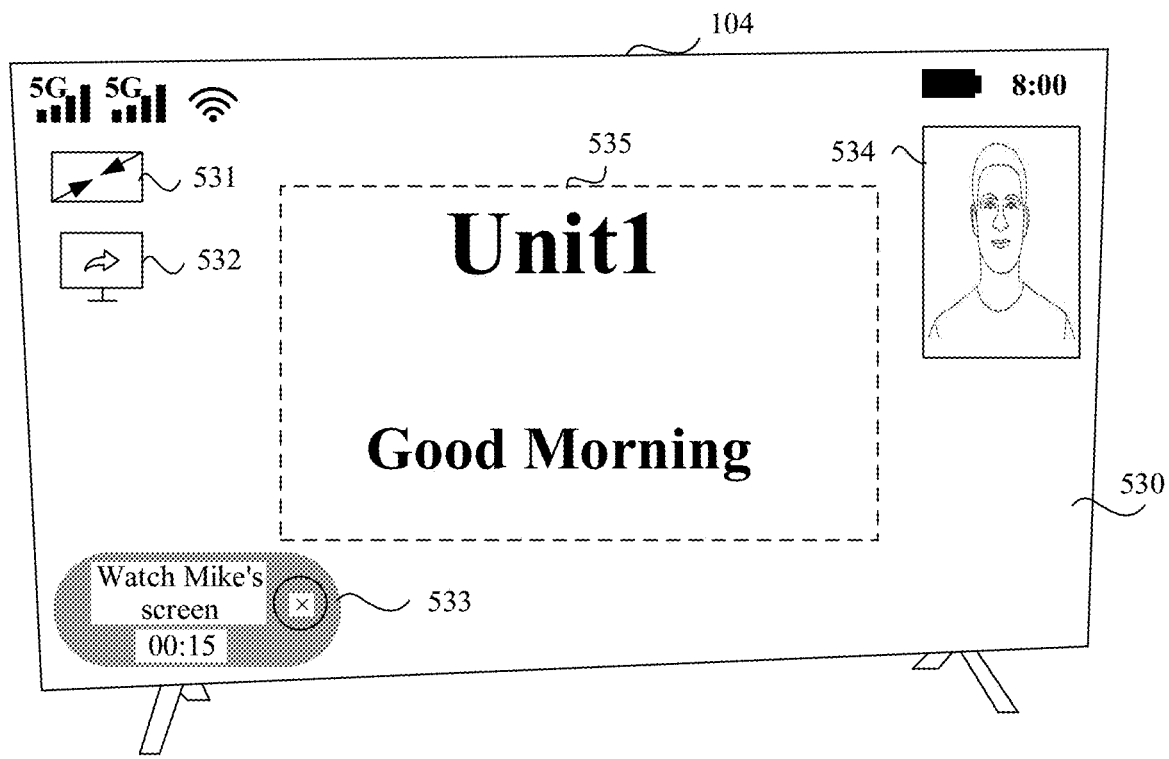
FIG. 8 is a schematic diagram of another user interface of an electronic device during screen sharing according to an embodiment of this application.

When receiving the second screen stream, the fourth electronic device 104 may display a user interface 530 shown in FIG. 8. Content included in the user interface 530 may be the same as content included in the user interface of the second electronic device 102 shown in FIG. 3A and FIG. 3F.

For example, the user interface shown in FIG. 3A and FIG. 3F includes a status bar (including a mobile communication signal strength component, a Wi-Fi signal strength component, a battery status component, and a time component), the third display area 302, the fourth display area 303, the minimization control 304, the projection control 305, and the "Sharing" prompt box 320.

Correspondingly, the user interface 530 shown in FIG. 8 includes a status bar (including a mobile communication signal strength component, a Wi-Fi signal strength component, a battery status component, and a time component), a display area 535, a display area 534, a minimization control 531, a projection control 532, and a "Sharing" prompt box 533.

Content displayed in the third display area 302 and content displayed in the fourth display area 303 may be interchanged. For a manner in which the second electronic device 102 interchanges the content displayed in the third display area 302 and the content displayed in the fourth display area 303, refer to the foregoing embodiment. Details are not described herein again. When the second electronic device 102 interchanges the content displayed in the third display area 302 and the content displayed in the fourth display area 303, the third display area 302 may display the image included in the first camera video stream, and the fourth display area 303 may display the image included in the first screen stream. In this case, when the fourth electronic device 104 displays an image included in the second screen stream, content displayed in the display area 535 may be the image in the first camera screen stream, and content displayed in the display area 534 may be the image in the first screen stream.

In some embodiments, the second electronic device 102 may adjust the second screen stream based on network quality of the second electronic device 102 and/or a congestion status of a channel for performing short-distance communication between the second electronic device 102 and the fourth electronic device 104, and then send the adjusted second screen stream to the fourth electronic device 104. For a manner in which the second electronic device 102 adjusts the second screen stream, refer to the manner in which the first electronic device 101 adjusts the first screen stream in the foregoing embodiment. Details are not described herein again. In a possible implementation, in addition to the second screen stream, the second electronic device 102 may further send the first audio to the fourth electronic device 104. In this case, the fourth electronic device 104 may display content displayed on the second electronic device 102, and play the first audio. The second electronic device 102 may not play the first audio.

For an implementation in which the second electronic device 102 receives the first audio, refer to the foregoing embodiment. Details are not described herein again.

In a possible implementation, in response to a user operation of switching the screen shared by the third electronic device 103 to the fourth electronic device 104 for display, the second electronic device 102 may display a first option and a second option on the user interface. The first option may be an option that indicates the second electronic device 102 to send the first screen stream to the fourth electronic device 104. The second option may be an option that indicates the second electronic device 102 to send the second screen stream to the fourth electronic device 104. Specifically, in response to a user operation performed on the first option, the second electronic device 102 may send the first screen stream to the fourth electronic device 104. The fourth electronic device 104 may display the user interface 510 shown in FIG. 3F. In response to a user operation performed on the second option, the second electronic device 102 may record the screen of the second electronic device 102 and obtain the second screen stream.

The second electronic device 102 may further send the second screen stream to the fourth electronic device 104. The fourth electronic device 104 may display the user interface 530 shown in FIG. 8.

Another Screen Sharing System Provided in an Embodiment of this Application is Specifically Described Below with Reference to the Screen Sharing Method in the Foregoing Embodiment.

Figure 9A:
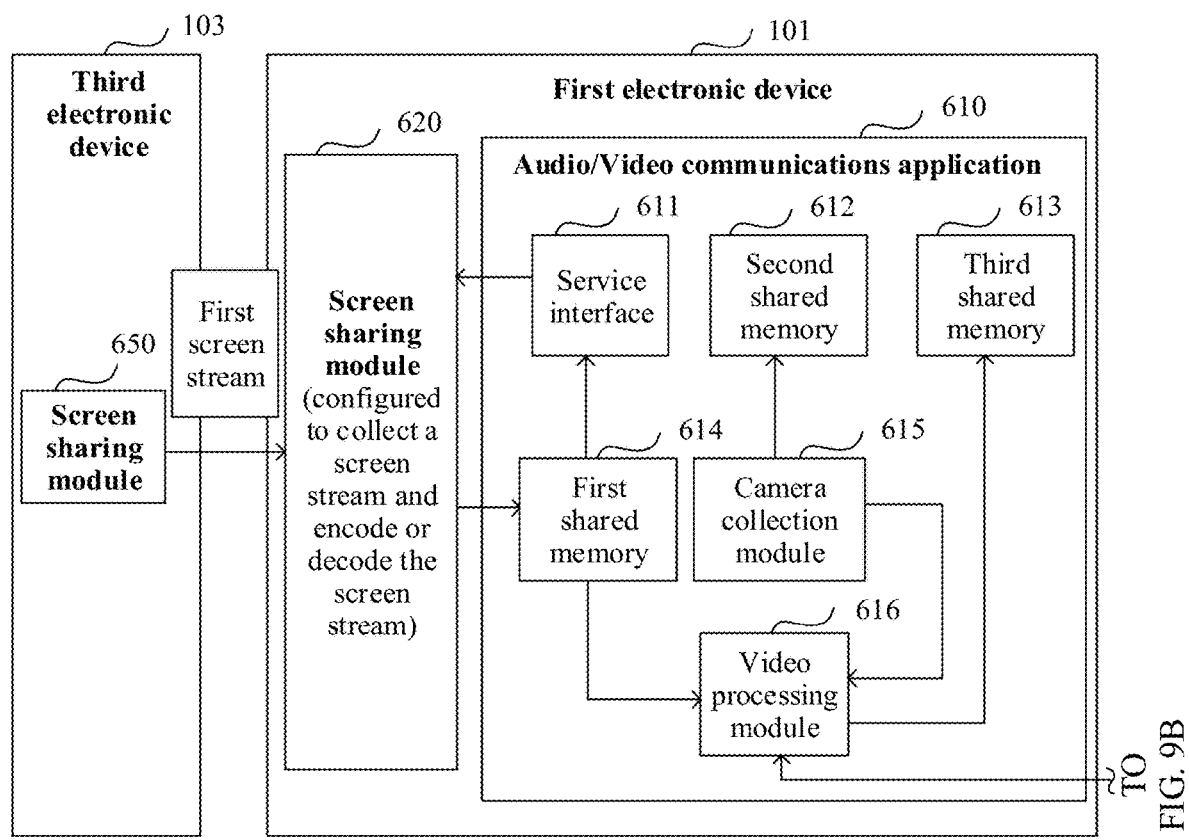
FIG. 9A and FIG. 9B are a schematic diagram of a structure of another screen sharing system according to an embodiment of this application.
Figure 9B:
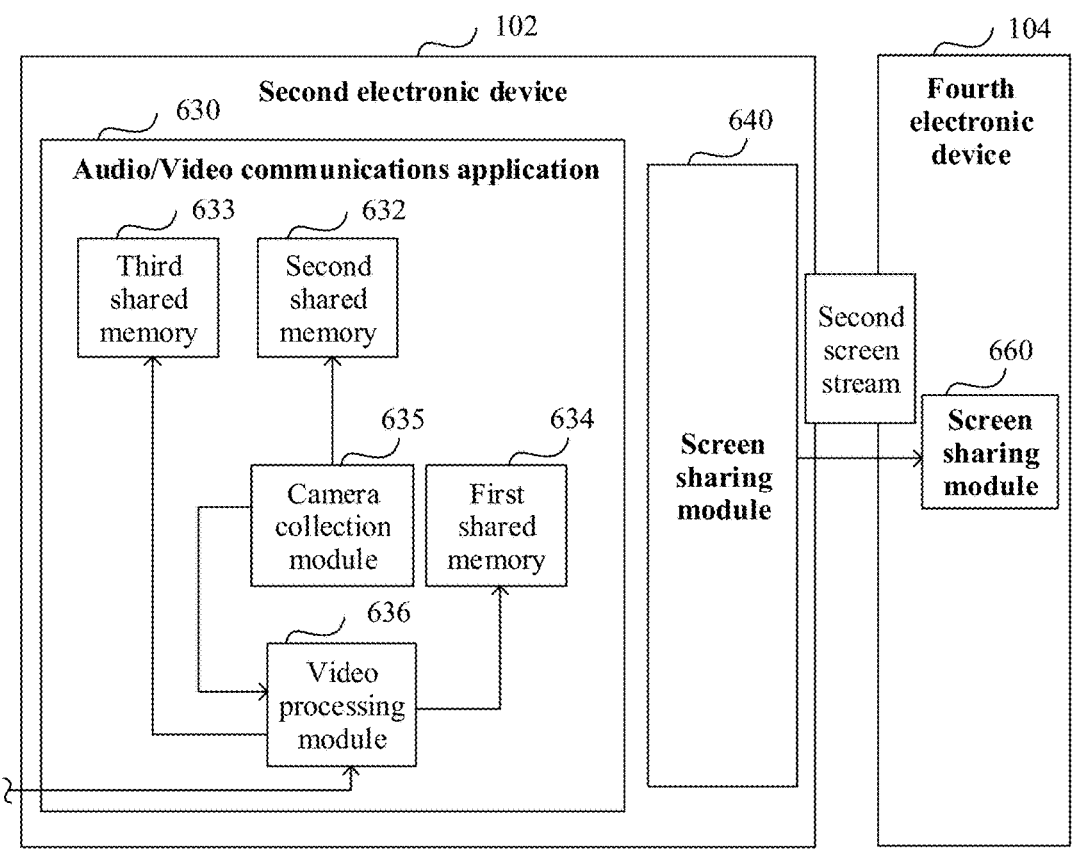

As shown in FIG. 9A and FIG. 9B, the screen sharing system may include a first electronic device 101, a second electronic device 102, a third electronic device 103, and a fourth electronic device 104. The first electronic device 101 may establish a video communication connection to the second electronic device 102. The third electronic device 103 may record a screen to obtain a first screen stream, and send the first screen stream to the second electronic device 102 by using the first electronic device 101. The second electronic device 102 may display an image included in the first screen stream. The second electronic device 102 may record a screen to obtain a second screen stream, and send the second screen stream to the fourth electronic device 104. The second screen stream may include an image included in a first camera video stream and the image included in the first screen stream. The fourth electronic device 104 may display content included in the second screen stream. In other words, during video communication, the second electronic device 102 may share a screen of the second electronic device 102 with the fourth electronic device 104.

For content included in the first electronic device 101, the second electronic device 102, the third electronic device 103, and the fourth electronic device 104, refer to the embodiment shown in FIG. 4A and FIG. 4B. Details are not described herein again.

For a manner of establishing the video communication connection between the first electronic device 101 and the second electronic device 102 and an implementation of sending the first screen stream to the first electronic device 101 by the third electronic device 103, refer to the foregoing embodiment. Details are not described herein again.

It should be noted that, when the video processing module 636 in the second electronic device 102 receives the encoded first screen stream, the video processing module 636 may perform decoding to obtain the first screen stream. The video processing module 636 may store the first screen stream in the first shared memory 634. The first screen stream may be sent to the screen of the second electronic device 102 for display.

In response to a user operation of switching a screen shared by the third electronic device 103 to the fourth electronic device 104 for display, for example, a touch operation performed on the "John's television" option 332 shown in FIG. 3F, the screen sharing module 640 in the second electronic device 102 may record the screen of the second electronic device 102, to obtain the second screen stream. Then, the screen sharing module 640 may encode the second screen stream in a video encoding format negotiated by the second electronic device 102 and the fourth electronic device 104, and send the encoded second screen stream to the screen sharing module 660 in the fourth electronic device 104.

The screen sharing module 660 may decode the encoded second screen stream, and send the second screen stream to a screen of the fourth electronic device 104 for display.

For a manner in which the second electronic device 102 performs screen recording to obtain the second screen stream, refer to the foregoing embodiment in which the third electronic device 103 performs screen recording to obtain the first screen stream. Details are not described herein again.

In the foregoing screen sharing system, the first electronic device 101 may establish the video communication connection to the second electronic device 102. During video communication, the third electronic device 103 near the first electronic device 101 may share the screen of the third electronic device 103 with the second electronic device 102 by using the first electronic device 101. The second electronic device 102 may further record the screen of the second electronic device 102, and deliver a screen stream obtained through recording to the fourth electronic device 104 near the second electronic device 102 for display. In this way, content displayed on the screen of the fourth electronic device 104 may include content displayed on the screen of the third electronic device 103. According to the screen sharing system, when performing video communication, a user may share a screen of an electronic device that is not during video communication connection, or may switch, for display, a received shared screen to an electronic device that is not during a video communication connection. Therefore, screen sharing is more flexible.

The First Electronic Device 101 and the Third Electronic Device 103 May Simultaneously Perform Screen Sharing with the Second Electronic Device 102.

In some embodiments, in response to a user operation performed on the first electronic device 101 to discover a shareable screen, for example, a touch operation performed on the device discovery control 201 shown in FIG. 3A, the first electronic device 101 may find one or more electronic devices. The one or more electronic devices may perform screen recording, and send screen streams obtained through recording to the second electronic device 102 by using the first electronic device 101.

Further, the first electronic device 101 may display an option corresponding to the first electronic device 101 and options corresponding to the one or more found electronic devices in the device option box 210 shown in FIG. 3B. One or two options in the device option box 210 may be selected. An electronic device corresponding to a selected option may perform screen recording, and may send a screen stream obtained through recording to the second electronic device 102 by using the first electronic device 101.

For example, in response to a user operation of selecting the option corresponding to the first electronic device 101 and an option corresponding to the third electronic device 103, the first electronic device 101 may record a screen of the first electronic device 101 to obtain a third screen stream. The first electronic device 101 may further send a screen sharing request to the second electronic device 102, and send a request for obtaining the first screen stream to the third electronic device 103.

When receiving the request for obtaining the first screen stream, the third electronic device 103 may record the screen of the third electronic device 103 to obtain the first screen stream, and send the first screen stream to the first electronic device 101.

If the second electronic device 102 detects a user operation of accepting screen sharing, the second electronic device 102 may send a screen sharing accept message to the first electronic device 101. Then, the first electronic device 101 may send the first screen stream and the third screen stream to the second electronic device 102.

When receiving the first screen stream and the third screen stream, the second electronic device 102 may respectively display the first screen stream and the third screen stream in the third display area 302 and the fourth display area 303 shown in FIG. 3A. Content displayed in the third display area 302 and content displayed in the fourth display area 303 may be interchanged.

Optionally, the second electronic device 102 may send the first screen stream and/or the third screen stream to the fourth electronic device 104. The fourth electronic device 104 may display an image included in the first screen stream and/or an image included in the third screen stream.

Not limited to one or two options, more than two options in the device option box 210 may be selected. When M options in the device option box 210 are selected, electronic devices corresponding to the M options may perform screen recording to obtain M screen streams. The M screen streams may be sent by the first electronic device 101 to the second electronic device 102. The screen of the second electronic device 102 may include M display areas. The M display areas may be respectively used to display images included in the M screen streams, where M is an integer greater than 2.

In addition, the second electronic device 102 may send one or more of the M screen streams to the fourth electronic device 104. The fourth electronic device 104 may display images included in the one or more received screen streams.

The First Electronic Device 101 May Display the Screen Shared by the Third Electronic Device 103.

In some embodiments, the first electronic device 101 may display the screen shared by the third electronic device 103. In addition, the first electronic device 101 may enable a graffiti function to record a first mark made on the screen of the first electronic device 101. The first electronic device 101 may send the first screen stream of the third electronic device 103 and the first mark to the second electronic device 102. The second electronic device 102 may display the image included in the first screen stream and the first mark.

In this way, in some application scenarios, for example, in a process in which the first user shares the screen of the third electronic device 103 with the second electronic device 102 by using the first electronic device 101, the first user may need to take the first electronic device 101 and walk around. If the first electronic device 101 may display the screen shared by the third electronic device 103, the first user may view the screen of the third electronic device 103 by using the first electronic device 101, and may mark the shared screen.

Specifically, when receiving the first screen stream, the first electronic device 101 may store the first screen stream in the first shared memory. The first screen stream may be obtained by the video processing module 616 shown in FIG. 4A and FIG. 4B, and sent to the second electronic device 102 after being encoded by the video processing module 616. The first screen stream may be further sent to the screen of the first electronic device 101 for display. For example, the first electronic device 101 may display the image included in the first screen stream in the first display area 202 shown in FIG. 3A, and display a second camera video stream of the second electronic device 102 in the second display area 203 shown in FIG. 3A.

In addition, the first electronic device 101 may further display the "Sharing" prompt box 420 shown in FIG. 3E-1 on the screen. The "Sharing" prompt box 420 may include a graffiti control 421. When the graffiti function is not enabled, in response to a user operation performed on the graffiti control 421, the first electronic device 101 may enable the graffiti function to record the first mark made on the screen of the first electronic device 101. For example, when the graffiti function is enabled, the first electronic device 101 may apply to a storage for a seventh shared memory. The first electronic device 101 may store the first mark in the seventh shared memory. A manner in which the first electronic device 101 records and sends the first mark is not limited in this embodiment of this application.

The first electronic device 101 may send the first screen stream and the first mark to the second electronic device 102. The second electronic device 102 may display the image included in the first screen stream and the first mark.

In some embodiments, when the first electronic device 101 establishes a video communication connection to the second electronic device 102, and the third electronic device 103 shares the screen with the second electronic device 102 by using the first electronic device 101, in response to a user operation of displaying, on the first electronic device 101, the screen shared by the third electronic device 103, the first electronic device 101 may display the image included in the first screen stream.

Alternatively, the first electronic device 101 may detect whether the first electronic device 101 is far away from the third electronic device 103. When receiving the first screen stream, if the first electronic device 101 detects that the first electronic device 101 is far away from the third electronic device 103, the first electronic device 101 may display the image included in the first screen stream. A method for detecting whether the first electronic device 101 is far away from the third electronic device 103 may include: The first electronic device 101 sends a sounding signal to the third electronic device 103 at intervals of a preset time period. The third electronic device 103 may return a response signal. The first electronic device 101 may determine, based on signal strength of the received response signal, whether the first electronic device 101 is far away from the third electronic device 103. Alternatively, the first electronic device 101 may determine a motion status of the first electronic device 101 by using a motion sensor of the first electronic device 101. When the first electronic device 101 determines that a quantity of movement steps exceeds a preset quantity of steps, the first electronic device 101 may determine that the first electronic device 101 is far away from the third electronic device 103. An implementation in which the first electronic device 101 detects whether the first electronic device 101 is far away from the third electronic device 103 is not limited in this embodiment of this application.

In this way, for example, in a scenario such as a video conference scenario or a video teaching scenario, the first user may share the screen of the third electronic device that is not during the video communication connection. In addition, a mark made by the first user on the third electronic device 103 may be sent to the second electronic device 102, and displayed by the second electronic device 102. The first user may further display, on the first electronic device 101, the screen shared by the third electronic device 103. A mark made by the first user on the first electronic device 101 may also be sent to the second electronic device 102, and displayed by the second electronic device 102. In other words, when the third electronic device 103 shares the screen, the first user may view the screen of the third electronic device 103 without staying beside the third electronic device 103, and explain, to the second user, content displayed on the screen of the third electronic device 103. This greatly improves screen sharing flexibility.

Figure 10A:
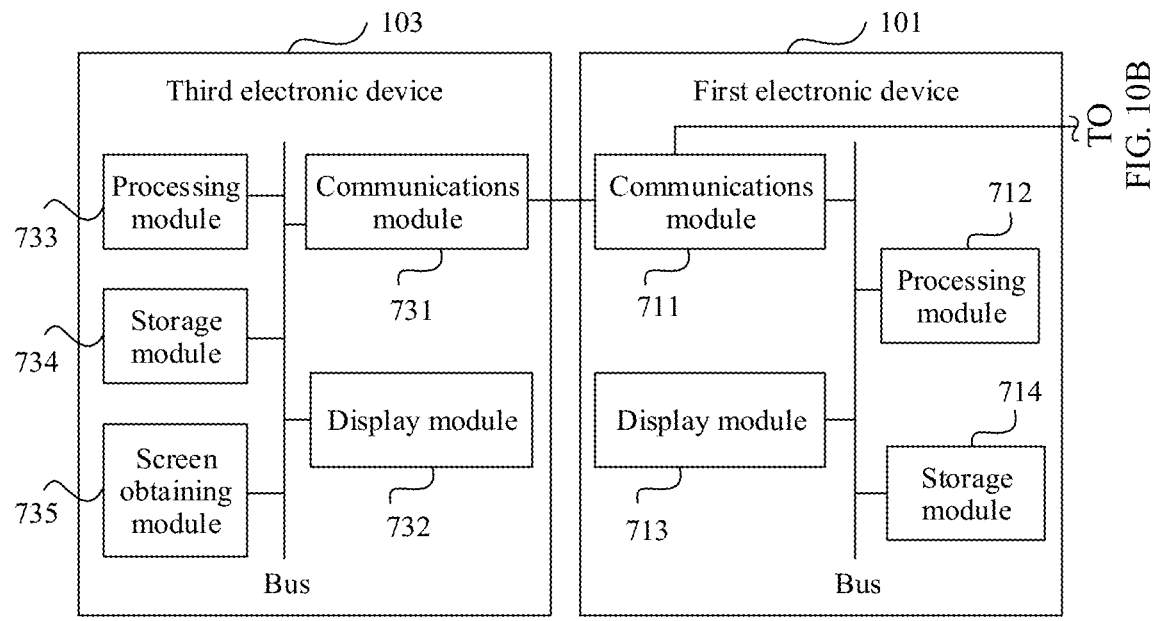
FIG. 10A and FIG. 10B are a schematic diagram of a structure of another screen sharing system according to an embodiment of this application.
Figure 10B:
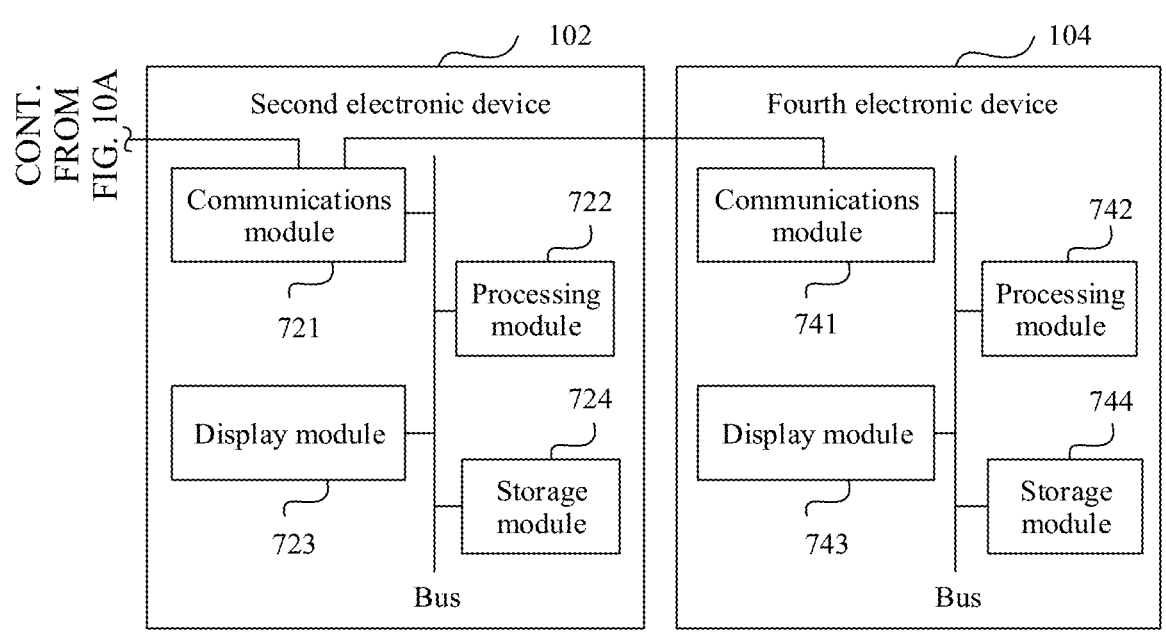

FIG. 10A and FIG. 10B Show an Example of Another Screen Sharing System According to an Embodiment of this Application.

As shown in FIG. 10A and FIG. 10B, the screen sharing system may include a first electronic device 101, a second electronic device 102, a third electronic device 103, and a fourth electronic device 104. The first electronic device 101 may include a communications module 711, a processing module 712, a display module 713, and a storage module 714 that are connected through a bus. The second electronic device 102 may include a communications module 721, a processing module 722, a display module 723, and a storage module 724 that are connected through a bus. The third electronic device 103 may include a communications module 731, a display module 732, a processing module 733, a storage module 734, and a screen obtaining module 735 that are connected through a bus. The fourth electronic device 104 may include a communications module 741, a processing module 742, a display module 743, and a storage module 744 that are connected through a bus. The third electronic device 103 may be an electronic device near the first electronic device 101. The fourth electronic device 104 may be an electronic device near the second electronic device 102.

Specifically, in the first electronic device 101, the communications module 711 may be configured to: establish a communication connection between the first electronic device 101 and the second electronic device, and establish a communication connection between the first electronic device 101 and the third electronic device 103. For example, the first electronic device 101 may establish a video communication connection to the second electronic device 102 by using the communications module 711. In this way, the first electronic device 101 may receive, by using the communications module 711, a second camera video stream collected by a camera of the second electronic device 102, and send a first camera video stream collected by a camera of the first electronic device 101 to the second electronic device 102 by using the communications module 711. The communications module 711 in the first electronic device 101 may exchange data with the third electronic device 103 based on a Wi-Fi direct network communications protocol. In this way, the first electronic device 101 may receive, by using the communications module 711, a first screen stream obtained by recording a screen by the third electronic device 103. Further, the first electronic device 101 may send the first screen stream to the second electronic device 102 by using the communications module 711. In this embodiment of this application, the communications module 711 may be the communications module 673 in the embodiment shown in FIG. 5A and FIG. 5B.

The processing module 712 may be configured to invoke the communications module 711 to send a communication connection establishment request to the second electronic device 102 and the third electronic device 103. The processing module 712 may further process a user operation performed on a touchscreen of the first electronic device 101. The processing module 712 may be further configured to: send the first screen stream of the third electronic device 103 to the storage module 714, and send the second camera video stream of the second electronic device 102 to the display module 713.

The display module 713 may be configured to display the second camera video stream and the first camera video stream that is collected by the camera of the first electronic device 101. In this embodiment of this application, the display module may be included in the touchscreen 671 in the embodiment shown in FIG. 5A and FIG. 5B.

The storage module 714 may be configured to store the first camera video stream, the second camera video stream, and the first screen stream. In this embodiment of this application, the storage module 714 may include the first shared memory 614, the second shared memory 612, and the third shared memory 613 in the embodiment shown in FIG. 4A and FIG. 4B.

In the second electronic device 102, for functions of the communications module 721, the processing module 722, the display module 723, and the storage module 724, refer to functions of corresponding modules in the first electronic device 101. It should be noted that the second electronic device 102 may receive the first camera video stream and the first screen stream by using the communications module 721. The second electronic device 102 may send the first screen stream to the fourth electronic device 104 by using the communications module 721, or send the first screen stream and the first camera video stream to the fourth electronic device 104.

Before the third electronic device 103 shares the screen, if the first electronic device 101 and the second electronic device 102 establish the video communication connection, the display module 723 in the second electronic device 102 may be configured to display an image included in the first camera video stream and an image included in the second camera video stream. When receiving the first screen stream, the display module 723 may be configured to display the image included in the first camera video stream and an image included in the first screen stream. When the second electronic device 102 sends the first screen stream to the fourth electronic device 104 by using the communications module, the display module 723 may be configured to display the image included in the first camera video stream and the image included in the second camera video stream. Alternatively, the display module 723 may be still configured to display the image included in the first camera video stream and the image included in the first screen stream.

In this embodiment of this application, the communications module 721 may be the communications module 674 in the embodiment in FIG. 5A and FIG. 5B. The display module 723 may be included in the touchscreen 676 in the embodiment in FIG. 5A and FIG. 5B. The storage module 724 may include the first shared memory 634, the second shared memory 632, and the third shared memory 633 in the embodiment in FIG. 4A and FIG. 4B.

In the third electronic device 103, for functions of the communications module 731, the display module 732, the processing module 733, and the storage module 734, refer to functions of corresponding modules in the first electronic device 101. It should be noted that the screen obtaining module 735 may be configured to record content displayed by the third electronic device 103 by using the display module 732, to obtain the first screen stream. Further, the third electronic device 103 may send the first screen stream to the first electronic device 101 by using the communications module 731.

In the fourth electronic device 104, for functions of the communications module 741, the processing module 742, the display module 743, and the storage module 744, refer to functions of corresponding modules in the first electronic device 101. It should be noted that the fourth electronic device 104 may receive the first screen stream by using the communications module 741. Further, the fourth electronic device 104 may display the image included in the first screen stream by using the display module 743. In this way, the fourth electronic device 104 may display the screen shared by the third electronic device 103.

In some embodiments, the second electronic device 102 may further include a screen obtaining module. The screen obtaining module may be configured to record content displayed by the second electronic device 102 by using the display module 723, to obtain a second screen stream. When the display module 723 in the second electronic device 102 displays the first screen stream, and the second electronic device 102 detects a user operation of switching the screen shared by the third electronic device 103 to the fourth electronic device 104 for display, the second electronic device 102 may send the second screen stream to the fourth electronic device 104 by using the communications module 721.

The first electronic device 101, the second electronic device 102, the third electronic device 103, and the fourth electronic device 104 each may further include more or fewer modules. This is not limited in this embodiment of this application.

In this application, during the establishment of the video communication connection between the first electronic device and the second electronic device, the first electronic device may display a first interface, and play a first video stream on the first interface. The first video stream may be the second camera video stream in the foregoing embodiment. That the first electronic device plays the first video stream on the first interface may be that the first electronic device displays an image included in the first video stream on the first interface. The first video stream may include a plurality of frames of images. The plurality of frames of images may include timestamps in a camera collection time sequence. The first electronic device may display the images included in the first video stream based on the timestamps of the plurality of frames of images in the first video stream. In other words, the first electronic device may display the images included in the first video stream in the time sequence of collecting the plurality of frames of images in the first video stream by the camera. In this application, that an electronic device plays a video stream may indicate that the electronic device displays an image included in the video stream.

The second electronic device may display a second interface, and play a second video stream on the second interface. The second video stream may be the first camera video stream in the foregoing embodiment.

In this application, the third electronic device sends a third video stream to the first electronic device. The third video stream may be the first screen stream in the foregoing embodiment.

In this application, the second electronic device plays the second video stream in a display area A of the second interface, and plays the third video stream in a display area B of the second interface. The display area A may be the fourth display area 303 shown in FIG. 3E-3. The display area B may be the third display area 302 shown in FIG. 3E-3.

In this application, the second electronic device performs screen recording when playing the third video stream, to obtain the second screen stream in the foregoing embodiment. The second electronic device may send the second screen stream to the fourth electronic device.

In this application, the first electronic device may send a screen recording instruction to the third electronic device during the video communication connection. The screen recording instruction may instruct the third electronic device to perform screen recording and obtain the third video stream. The screen recording instruction may be sent by the first electronic device in response to a user operation performed on the "Mike's tablet" option 211 shown in FIG. 3B.

According to the context, a term "when" used in embodiments may be interpreted as a meaning of "if", "after", "in response to determining", or "in response to detecting". Similarly, according to the context, a phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of the procedures or functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a ROM, a random access memory RAM, a magnetic disk, or an optical disc.

What is claimed is:

1. A screen sharing method applied to a screen sharing system comprising a first electronic device, a second electronic device, and a third electronic device, each of the devices having a display screen, the method comprising:
    establishing, by one of the first electronic device and the second electronic device, a first video communication connection directly with the other of the first electronic device and second electronic device;
    displaying on the screen of the first electronic device, a first interface and playing a first video stream on the first interface, the first video stream being collected by the second electronic device from a first camera during the video communication connection;
    displaying on the screen of the second electronic device, a second interface and playing a second video stream on the second interface, the second video stream being collected by the first electronic device from a second camera during the first video communication connection;
    sending, by the third electronic device to the first electronic device along a second video communication connection directly connecting the first and third mobile devices, first data corresponding to content on the screen of the third electronic device;
    sending, by the first electronic device, the first data to the second electronic device via the first video connection directly connecting the first and second electronic devices;
    displaying first content on the second interface of the display screen of the second electronic device based on the first data, the first content comprising content displayed on the screen of the third electronic device;
    displaying on the screen of the first mobile device content that does not include content displayed on the screen of the third electronic device;
    sending, by the second electronic device, a fourth video stream to a fourth electronic device directly connected to the second mobile device via a third video communications connection after receiving the third video stream, the fourth video stream comprising content displayed on the screen of the third electronic device; and
    playing, by the fourth electronic device, the fourth video stream.

2. The method according to claim 1, further comprising:
    displaying, by the fourth electronic device based on the first data, second content, wherein the second content comprises the content displayed on the screen of the third electronic device; and
    playing, by the second electronic device, the second video stream in a first display area A of the second interface and playing the third video stream in a second display area B of the second interface.

3. The method according to claim 2, further comprising:
    canceling, by the second electronic device, displaying of the first content on the second interface when the fourth electronic device displays the second content.

4. The method according to claim 3, further comprising:
    displaying, by the second electronic device based on the first data, the first content on the second interface after the fourth electronic device cancels displaying of the second content.

5. The method according to claim 1, wherein:
    the content displayed on the screen of the third electronic device does not comprise content of either the first video stream or the second video stream; or
    the fourth video stream is the same as the third video stream; or
    the fourth video stream comprises the third video stream and the second video stream.

6. The method according to claim 1, further comprising:
    sending, by the first electronic device, a first message to the second electronic device querying whether the second user accepts content sharing;
    displaying, by the second electronic device, a first control when receiving the first message, wherein the first control provides for acceptance of content sharing; and
    sending, by the second electronic device in response to an operation performed on the first control, a second message to the first electronic device, wherein the second message indicates acceptance of content sharing.

7. The method according to claim 6, further comprising:
    displaying, by the third electronic device, a second control providing for cancelling of content sharing;
    sending, by the third electronic device in response to an operation performed on the second control, a third message to the first electronic device instructing cancellation of content sharing;

sending, by the first electronic device based on the third message, a fourth message to the second electronic device; and cancelling, by the second electronic device in response to the fourth message, displaying of the first content.

8. The method according to claim 1, further comprising:
displaying, by the second electronic device, the first video stream on the second interface when the second electronic device displays the first content and plays the second video stream on the second interface.

9. The method according to claim 1, wherein the first data comprises a first mark generated by the third electronic device based on a touch trace on the screen of the first electronic device.

10. The method according to claim 1, wherein;
communication between the first electronic device and the third electronic device is short-range communication that starts after the first electronic device receives the third video stream; and the method further comprises detecting, by the first electronic device, that the first electronic device is far away from the third electronic device, and playing, by the first electronic device, the third video stream.

11. A screen sharing system, comprising:
a first electronic device, a second electronic device, and a third electronic device, and a fourth electronic device, the first electronic device being configured to establish a first video communication connection directly with the second electronic device, each of the electronic devices having a display screen;

the first electronic device being configured to display a first interface on the screen of the first electronic device and to play a first video stream on the first interface, the first video stream being collected by the second electronic device from a first camera during the first video communication connection;

the second electronic device being configured to display on the screen of the second electronic device a second interface and to play a second video stream on the second interface, the second video stream being collected by the first electronic device from a second camera during the video communication connection;

the third electronic device being configured to send along a second video communication connection directly connecting the first and third electronic devices first data corresponding to content on the screen of the third electronic device;

the first electronic device being further configured to send the first data to the second electronic device via the first video connection directly connecting the first and second electronic devices;

the second electronic device being further configured to display, based on the first data, first content on the second interface of the display screen of the second electronic device, the first content comprising content displayed on the screen of the third electronic device and does not include content displayed on the screen of the third electronic device;

the second electronic device being further configured to send a fourth video stream to the fourth electronic device after receiving the third video stream, the fourth video stream comprising content displayed on the screen of the third electronic device; and the fourth electronic device being configured to play the fourth video stream.

12. The system according to claim 11, wherein:
the second electronic device is further configured to send the first data to the fourth electronic device; the fourth electronic device is configured to display on the screen of the third electronic device, second content based on the first data; and the second electronic is further configured to play the second video stream in a first display area A of the second interface and to play the third video stream in a second display area B of the second interface.

13. The system according to claim 12, wherein:
the content displayed on the screen of the third electronic device does not comprise content of either the first video stream or the second video stream; or the fourth video stream is the same as the third video stream; or the fourth video stream comprises the third video stream and the second video stream.

14. The system according to claim 12, wherein:
the second electronic device is further configured to cancel displaying of the first content on the second interface when the fourth electronic device displays the second content.

15. The system according to claim 14, wherein:
the second electronic device is configured to display, based on the first data, the first content on the second interface after the fourth electronic device has been configured to cancel displaying of the second content.

16. The system according to claim 11, wherein prior to configuring the third electronic device to send the first data to the first electronic device:
the first electronic device is further configured to send a first message to the second electronic device to query whether the second user accepts content sharing;

the second electronic device is further configured to display a first control when receiving the first message to accept content sharing; and the second electronic device is further configured to send, in response to an operation performed on the first control, a second message to the first electronic device, indicating acceptance of content sharing.

17. The system according to claim 16, wherein:
the third electronic device is further configured to display a second control to cancel content sharing;

the third electronic device is further configured to send, in response to an operation performed on the second control, a third message to the first electronic device indicating cancellation of content sharing;

the first electronic device is further configured to send a fourth message to the second electronic device; and the second electronic device is further configured to cancel, in response to the fourth message, displaying of the first content.

18. The system according to claim 11, wherein:
the second electronic device is further configured to display the first video stream on the second interface when the second electronic device is configured to display the first content and to play the second video stream on the second interface.

19. The system according to claim 11, wherein the first data comprises a first mark generated by the third electronic device based on a touch trace on the screen of the first electronic device.

20. The system according to claim 11, wherein communication between the first electronic device and the third electronic device is short-range communication.

21. A screen sharing method applied to a screen sharing system operating in a wireless network, the screen sharing system comprising a first mobile device, a second mobile device, and a third mobile device, each of the mobile devices having a display screen, the first mobile device and the third mobile device being associated with a first user and the second mobile device being associated with a second user, the method comprising:

establishing, by the first mobile device, a first video communication connection directly with the second mobile device;

displaying a first interface on the screen of the first mobile device and playing a first video stream on the first interface, the first video stream being collected by the second mobile device from a first camera during the video communication connection;

displaying on the screen of the second mobile device, a second interface and playing a second video stream on the second interface, the second video stream being collected by the first mobile device from a second camera via the first video communication connection;

sending, by the third mobile device to the first mobile device along a second video communication connection directly connecting the first and third mobile devices, first data corresponding to content on the screen of the third mobile device;

sending, by the first mobile device, the first data to the second mobile device via the first video connection directly connecting the first and second electronic devices;

displaying first content on the second interface of the display screen of the second mobile device based on the first data, the first content comprising content displayed on the screen of the third mobile device;

displaying on the display screen of the first mobile device content that does not include content displayed on the screen of the third mobile device;

sending, by the second mobile device, a fourth video stream to a fourth mobile device directly connected to the second mobile device via a third video communications connection after receiving the third video stream, the fourth video stream comprising content displayed on the screen of the third mobile device; and playing, by the fourth mobile device, the fourth video stream.

* * * * *